(12) United States Patent
Nakazima

(10) Patent No.: US 8,321,986 B2
(45) Date of Patent: Dec. 4, 2012

(54) NOZZLE CLEANER

(75) Inventor: Kotaro Nakazima, Toyoake (JP)

(73) Assignee: Kyokutoh Co., Ltd., Nagoya (JP)

( * ) Notice: Subject to any disclaimer, the term of this patent is extended or adjusted under 35 U.S.C. 154(b) by 916 days.

(21) Appl. No.: 12/417,169

(22) Filed: Apr. 2, 2009

(65) Prior Publication Data

US 2009/0249567 A1 Oct. 8, 2009

(30) Foreign Application Priority Data

Apr. 8, 2008 (JP) .................................. 2008-100547

(51) Int. Cl.
*A47L 3/00* (2006.01)
(52) U.S. Cl. ................................ 15/3; 15/93.1; 219/136
(58) Field of Classification Search ............... 15/3, 93.1; 219/136
See application file for complete search history.

(56) References Cited

U.S. PATENT DOCUMENTS

| | | | | |
|---|---|---|---|---|
| 4,583,257 A | * | 4/1986 | Bridges et al. ................. | 15/93.1 |
| 5,138,969 A | * | 8/1992 | Thielmann ...................... | 118/72 |
| 5,221,826 A | * | 6/1993 | Lee et al. ....................... | 219/136 |
| 5,845,357 A | * | 12/1998 | Anderson ....................... | 15/93.1 |
| 6,399,917 B1 | * | 6/2002 | Simond .......................... | 219/136 |

FOREIGN PATENT DOCUMENTS

| | | |
|---|---|---|
| JP | 2003-326366 | 11/2003 |
| JP | 2006-524576 | 11/2006 |

\* cited by examiner

*Primary Examiner* — Joseph J Hail
*Assistant Examiner* — Shantese McDonald
(74) *Attorney, Agent, or Firm* — Maschoff Gilmore & Israelsen

(57) ABSTRACT

A nozzle cleaner having a configuration for centering a cutter thereof with respect to a welding nozzle. The nozzle cleaner peels off sputter from an inner peripheral surface of a welding nozzle by inserting the cutter toward the inner peripheral surface of the welding nozzle, and then rotating the cutter. The nozzle cleaner includes a guide mechanism to center the welding nozzle with respect to the cutter. The guide mechanism includes an insertion-side roller unit and a cutter-side roller unit, each having a pair of guide rollers having a smaller diameter portion and a pair of enlarged diameter portions. The enlarged diameter portions guide the welding nozzle to the vicinity of the central position of the corresponding smaller diameter portion. The facing guide rollers of the cutter-side roller unit and of the insertion-side roller unit are arranged in arrangement directions orthogonal to each other, respectively.

11 Claims, 13 Drawing Sheets

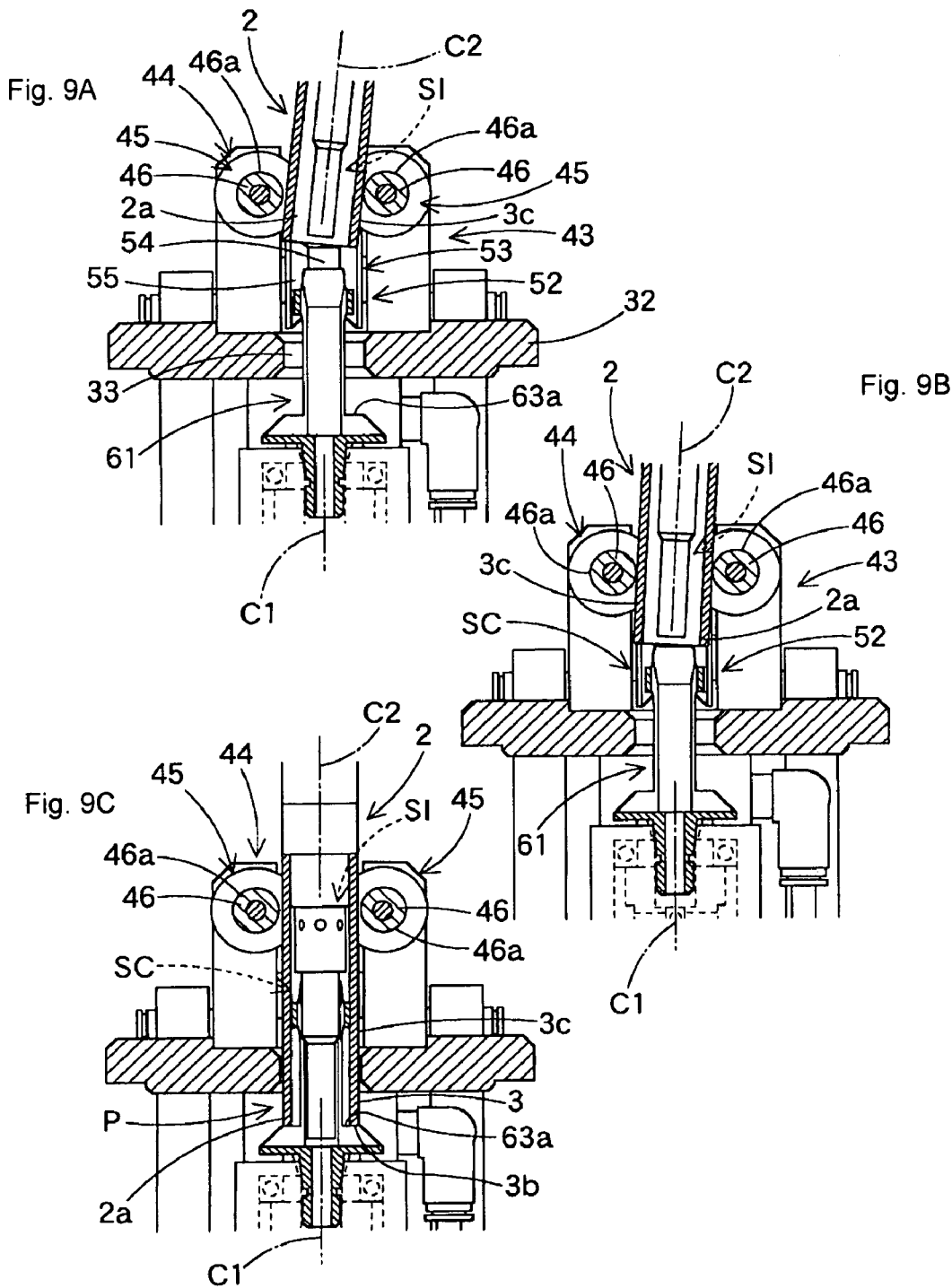

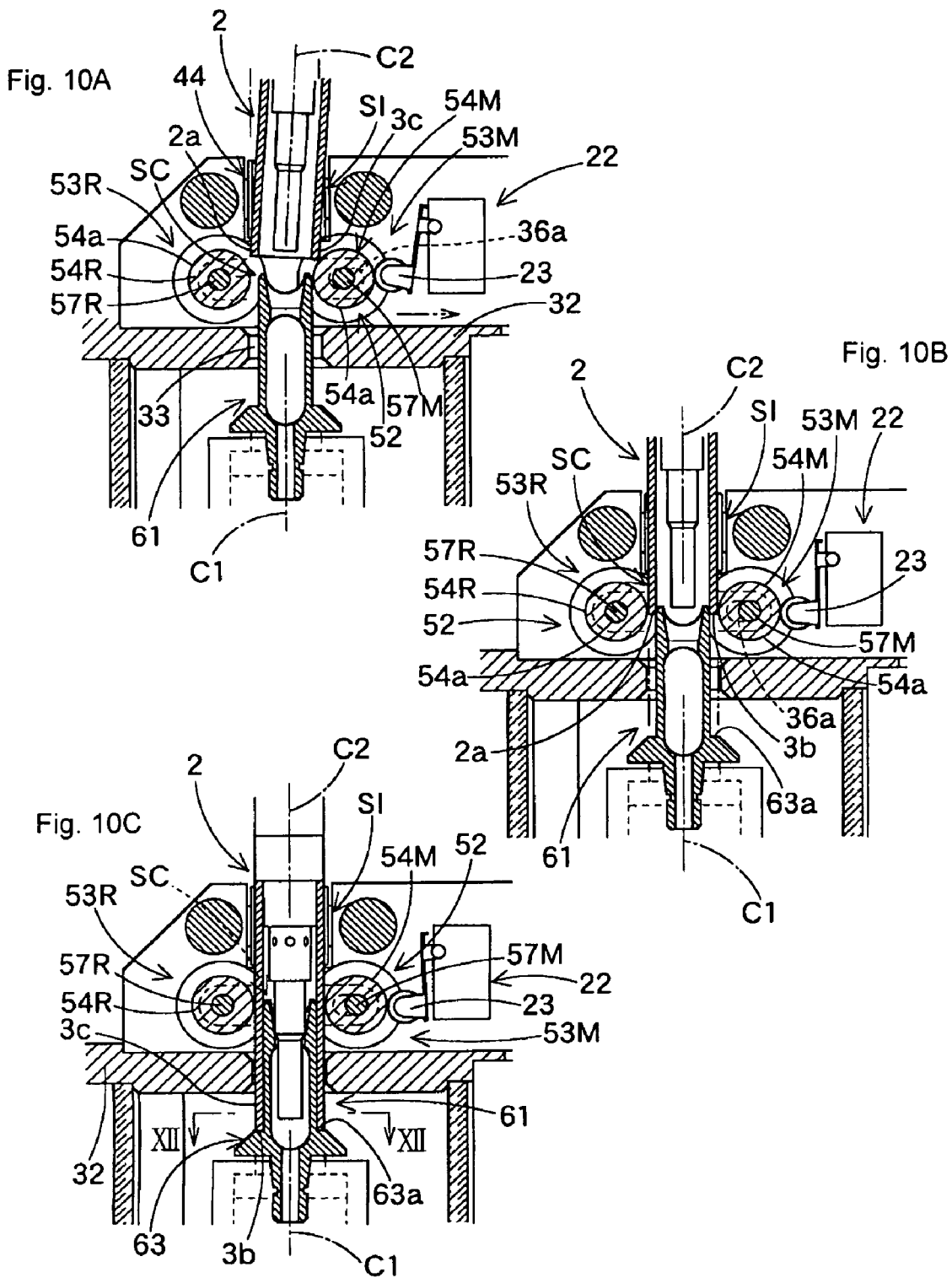

NOZZLE CLEANER

This application claims the benefit of Japanese Patent Application No. 2008-100547, filed on Apr. 8, 2008 which is hereby incorporated by reference as if fully set forth herein.

BACKGROUND OF THE INVENTION

1. Field of the Invention

The present invention relates to a nozzle cleaner for removing sputter attached to a cylindrical welding nozzle used in a gas arc welding process.

2. Discussion of the Related Art

Conventionally, a nozzle cleaner is used to remove sputter attached to a cylindrical welding nozzle used in a gas arc welding process. There is a conventional nozzle cleaner including a cutter. In this nozzle cleaner, a blade of the cutter is inserted into a welding nozzle retained by a retainer such that the blade comes into contact with an inner peripheral surface of the welding nozzle. As the cutter rotates, the blade of the cutter peels off sputter from the inner peripheral surface of the welding nozzle, thereby removing the sputter. Such a conventional nozzle cleaner is disclosed in, for example, Japanese Patent Laid-open Publication No. 2003-326366 and Japanese Patent Publication No. 2006-524576.

In the above-mentioned conventional nozzle cleaner, however, the retainer, which retains the welding nozzle, is driven by a driving source separate from a driving source used to rotate the cutter. Furthermore, in the conventional nozzle cleaner, the insertion of the blade toward the inner peripheral surface of the welding nozzle retained by the retainer is achieved by upwardly moving the cutter with respect to the welding nozzle, using an elevator. For this reason, it is also necessary to use another separate driving source, in order to drive the elevator for an upward movement of the cutter. In this case, there is another problem in that it is difficult to move the cutter while precisely centering the cutter with respect to the welding nozzle.

SUMMARY OF THE INVENTION

Accordingly, the present invention is directed to a nozzle cleaner that substantially obviates one or more problems due to limitations and disadvantages of the related art.

An object of the present invention is to provide a nozzle cleaner having a simple and convenient configuration capable of easily achieving the centering of a cutter thereof with respect to a welding nozzle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a nozzle cleaner for removing sputter attached to at least an inner peripheral surface of a cylindrical welding nozzle for gas arc welding comprises: a cutter including a blade provided at a leading end of the cutter, the blade being inserted toward the inner peripheral surface of the welding nozzle as the welding nozzle moves to a sputter removing position in a direction corresponding to a tip of the welding nozzle along an axial direction of the welding nozzle, and then peeling off the sputter attached to the inner peripheral surface of the welding nozzle as the cutter rotates; a driving mechanism to rotate the cutter; and a guide mechanism to center the welding nozzle with respect to a rotational central axis of the cutter when the welding nozzle moves to the sputter removing position, to enable the blade of the cutter to be inserted toward the inner peripheral surface of the welding nozzle.

The guide mechanism may comprise an insertion-side roller unit and a cutter-side roller unit arranged adjacent to each other along the rotational central axis of the cutter. The insertion-side roller unit may be positioned in a region where the welding nozzle is inserted. The cutter-side roller unit may be positioned in a region where the cutter is arranged, and a leading portion of the inserted welding nozzle in an insertion direction of the welding nozzle is positioned.

Each of the insertion-side roller unit and the cutter-side roller unit may comprise a pair of guide rollers arranged to face each other at opposite sides of the rotational central axis of the cutter such that an axial direction of each guide roller is orthogonal to the rotational central axis of the cutter, while being freely rotatable.

Each of the guide rollers may have a substantially-hourglass-shaped structure including a substantially-cylindrical smaller diameter portion, and two enlarged diameter portions arranged at opposite axial ends of the smaller diameter portion while having a diameter increasing gradually from the smaller diameter portion.

The facing guide rollers in each of the insertion-side roller unit and the cutter-side roller unit may be arranged such that a space defined between the smaller diameter portions of the guide rollers is substantially equal to an outer diameter of the welding nozzle. The enlarged diameter portions may be enlarged in diameter from the corresponding smaller diameter portion such that, when the welding nozzle is inserted into the space between the smaller diameter portions, the enlarged diameter portions guide the welding nozzle to a vicinity of a central position on the corresponding smaller diameter portion in an axial direction of the corresponding guide roller.

The facing guide rollers of the cutter-side roller unit and the facing guide rollers of the insertion-side roller unit may be arranged in arrangement directions orthogonal to each other, respectively.

One roller of the cutter-side roller unit may comprise a moving roller, and the other roller of the cutter-side roller unit may comprise a fixed roller. The moving roller may be installed to be movable to be spaced away from the fixed roller in a longitudinal direction orthogonal to the rotational central axis of the cutter, in a state of being always urged by an urging unit to cause an outer peripheral surface of the welding nozzle to come into contact with a smaller diameter portion of the fixed roller.

The nozzle cleaner may further comprise a driving mechanism to rotate the cutter. The driving mechanism may include a start switch to start a rotation of the cutter.

The start switch may include an actuating member arranged within a movement range that the moving roller moves to be spaced away from the fixed roller, such that the actuating member is pressed by the moving roller when the moving roller is spaced away from the fixed roller against the urging unit as the welding nozzle is inserted into the space between the smaller diameter portions of the cutter-side roller unit, thereby switching on the start switch.

Upon operating the nozzle cleaner of the present invention, a leading end of the welding nozzle is first inserted into the insertion-side space between the smaller diameter portions of the guide rollers in the insertion-side roller unit, and then moved in a direction corresponding to the nozzle leading end along an axial direction of the welding nozzle. At this time, the welding nozzle is guided by the freely-rotatable guide rollers of the insertion-side roller unit and cutter-side roller unit such that it is moved to the sputter removing position in a state of being centered with respect to the cutter. In this state, the blades of the cutter are inserted toward the inner peripheral surface of the welding nozzle. In detail, in the nozzle cleaner of the present invention, each of the guide rollers constituting the insertion-side roller unit and cutter-side roller unit includes a smaller diameter portion having a cylindrical shape, and a pairs of enlarged diameter portions extending from axial opposite ends of the smaller diameter portion while having a diameter increasing gradually from the smaller diameter portions. Also, the space between the smaller diameter portions of the corresponding guide rollers, into which the welding nozzle is inserted, is set to be substantially equal to the outer diameter of the welding nozzle.

Accordingly, when the welding nozzle is moved to be inserted into a space defined between the smaller diameter portions of the guide rollers in the insertion-side roller unit (hereinafter, referred to as an "insertion-side space") the insertion direction of the welding nozzle is regulated by the outer peripheral surface of each smaller diameter portion in a lateral direction crossing (orthogonal to) the axial direction of the corresponding guide roller, and the welding nozzle is guided, in a longitudinal direction corresponding to the axial direction of the guide roller, to the vicinity of a central position on the smaller diameter portion in an axial direction of the smaller diameter portion by the enlarged diameter portions, even though the welding nozzle may be inserted such that the center (axial center) is inclined with respect to the rotational central axis of the cutter. Thus, in the insertion-side space, the welding nozzle is arranged such that the center (axial center) is aligned with the rotational central axis of the cutter.

Thereafter, the welding nozzle is moved to be inserted into a space defined between the smaller diameter portions of the guide rollers in the cutter-side roller unit (hereinafter, referred to as a "cutter-side space"). At this time, the insertion direction of the welding nozzle is regulated by the outer peripheral surface of each smaller diameter portion in a longitudinal direction crossing (orthogonal to) the axial direction of the corresponding guide roller, and the welding nozzle is guided, in a lateral direction corresponding to the axial direction of the guide roller, to the vicinity of a central position on the smaller diameter portion in the axial direction of the smaller diameter portion by the enlarged diameter portions, even though the welding nozzle is inserted such that the center (axial center) is inclined with respect to the rotational central axis of the cutter. Thus, even in the cutter-side space, the welding nozzle is arranged such that the center (axial center) is aligned with the rotational central axis of the cutter. When the leading end of the welding nozzle is inserted into the cutter-side space between the smaller diameter portions of the guide rollers in the cutter-side roller unit, the welding nozzle passes through the insertion-side space and cutter-side space formed in two regions spaced apart from each other in a direction along the rotational central axis of the cutter under the condition in which the center (axial center) of the welding nozzle is aligned with the rotational central axis of the cutter. As a result, the center (axial center) of the welding nozzle is arranged to be co-axial and parallel with the rotational central axis of the cutter. Thus, the center (axial center) of the welding nozzle is centered with the rotational central axis of the cutter. In other words, the welding nozzle is inserted into insertion holes (the space between the smaller diameter portions including the space between the enlarged diameter portions and the space between the smaller diameter portions including the space between the enlarged diameter portions) formed at two regions spaced apart from each other in a direction along the rotational central axis of the cutter. Accordingly, the welding nozzle is centered with the axial axes of the two insertion holes, and thus with the rotational central axis of the cutter. Of course, in the illustrated embodiment, the resistance applied to the welding nozzle when the welding nozzle is guided by the insertion holes is small because the guide rollers constituting the insertion-side roller unit and cutter-side roller unit while forming the edges of the insertion holes are arranged to be freely rotatable. Also, the deformation of the welding nozzle by the guide rollers is also inhibited. Thus, it is possible to smoothly guide the welding nozzle toward the cutter.

In particular, in the nozzle cleaner of the present invention, shaking of the center (axial center) of the welding nozzle with respect to the rotational central axis of the cutter during the insertion of the welding nozzle is prevented as the welding nozzle passes through the space between the smaller diameter portions in a pair of guide rollers arranged to face each other and the space between the smaller diameter portions in a pair of guide rollers arranged to face each other. In the present invention, the insertion-side roller unit and cutter-side roller unit, in which the arrangement direction of the facing guide rollers in the insertion-side roller unit and the arrangement direction of the facing guide rollers in the cutter-side roller unit are orthogonal to each other, are arranged adjacent to each other along the rotational central axis of the cutter. Accordingly, it is possible to securely prevent the shaking of the center (axial center) of the welding nozzle (shaking causing radial misalignment from the center) by a simple configuration including only two stages, namely, the insertion-side roller unit and cutter-side roller unit. When the welding nozzle is moved to the sputter removing position while maintaining the centering of the center (axial center) of the welding nozzle with the rotational central axis of the cutter, the blades can be smoothly inserted into the welding nozzle.

As a result, in the present invention, it is possible to position the welding nozzle at the sputter removing position while inserting the blades of the cutter toward the inner peripheral surface under the condition in which the center (axial center) of the welding nozzle is accurately centered with respect to the rotational central axis of the cutter, only by inserting the welding nozzle into the insertion-side space between the smaller diameter portions of the guide rollers in the insertion-side roller unit, and then downwardly moving the welding nozzle such that the welding nozzle is more deeply inserted. It is then possible to peel off sputter from the inner peripheral surface of the welding nozzle by rotating the cutter.

Thus, the nozzle cleaner of the present invention can be simply configured, and the centering of the welding nozzle with the cutter can also be easily achieved.

Although the movement direction of the welding nozzle in the nozzle cleaner having the above-described configuration may be slightly misaligned from the rotational central axis of the cutter when the leading end of the welding nozzle is inserted into the cutter-side space between the smaller diameter portions of the guide rollers in the cutter-side roller unit, the moving roller first moves to be spaced away from the fixed roller, and then urges the welding nozzle toward the fixed roller to bring the outer peripheral surface into contact with the outer peripheral surface of the smaller diameter portion of the fixed roller. Thus, the accuracy of the centering of the welding nozzle with respect to the cutter on the basis of the fixed roller can be further improved.

In the nozzle cleaner having the above-described configuration, the actuating member switches on the start switch when it comes into contact with the moving roller, thereby starting the rotation of the cutter. Accordingly, the switch can operate conveniently and accurately without being influenced by the removed sputter, while maintaining high durability, as compared to the case in which a non-contact type switch is used.

Also, in the nozzle cleaner having the above-described configuration, the cutter may be arranged between the smaller diameter portions of the cutter-side roller unit such that the tip end of each blade is positioned at a position where the smaller diameter portions of the guide rollers in the cutter-side roller unit are most approximate to each other. Accordingly, once the centering of the center (axial center) of the welding nozzle with respect to the rotational central axis of the cutter is completed, it is possible to immediately insert the blades of the cutter toward the inner peripheral surface of the welding nozzle. Thus, the movement distance of the welding nozzle can be set to a short distance. It is also possible to compactly arrange the cutter-side roller unit and cutter (to compact the space associated with the rotational central axis of the cutter.

Also, in the nozzle cleaner having the above-described configuration, each blade of the cutter may include an inner-periphery-side cutting blade, which can be inserted toward the inner peripheral surface of the welding nozzle, to remove sputter attached to the inner peripheral surface of the welding nozzle, and a start-portion-side cutting blade, which comes into contact with the tip surface of the gas nozzle at a position where the blade has been completely inserted into the welding nozzle, to remove sputter attached to the tip surface of the welding nozzle.

In the nozzle cleaner of the present invention, the start-portion-side cutting blade can prevent an excessive movement of the welding nozzle in an insertion direction because the start-portion-side cutting blade functions a stopper to regulate a movement of the welding nozzle in the insertion direction. Accordingly, it is possible to accurately position the welding nozzle at the sputter removing position. In the nozzle cleaner having the above-described configuration, it is possible not only to remove sputter attached to the inner peripheral surface of the welding nozzle by the inner-periphery-side cutting blade, but also to remove sputter attached to the tip surface of the welding nozzle by the start-portion-side cutting blade.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 9A to 9C are partial longitudinal sectional views taken in a lateral direction, sequentially illustrating a centering operation in the nozzle cleaner according to the illustrated embodiment;

FIGS. 10A to 10C are partial longitudinal sectional views taken in a longitudinal direction, sequentially illustrating the centering operation in the nozzle cleaner according to the illustrated embodiment;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
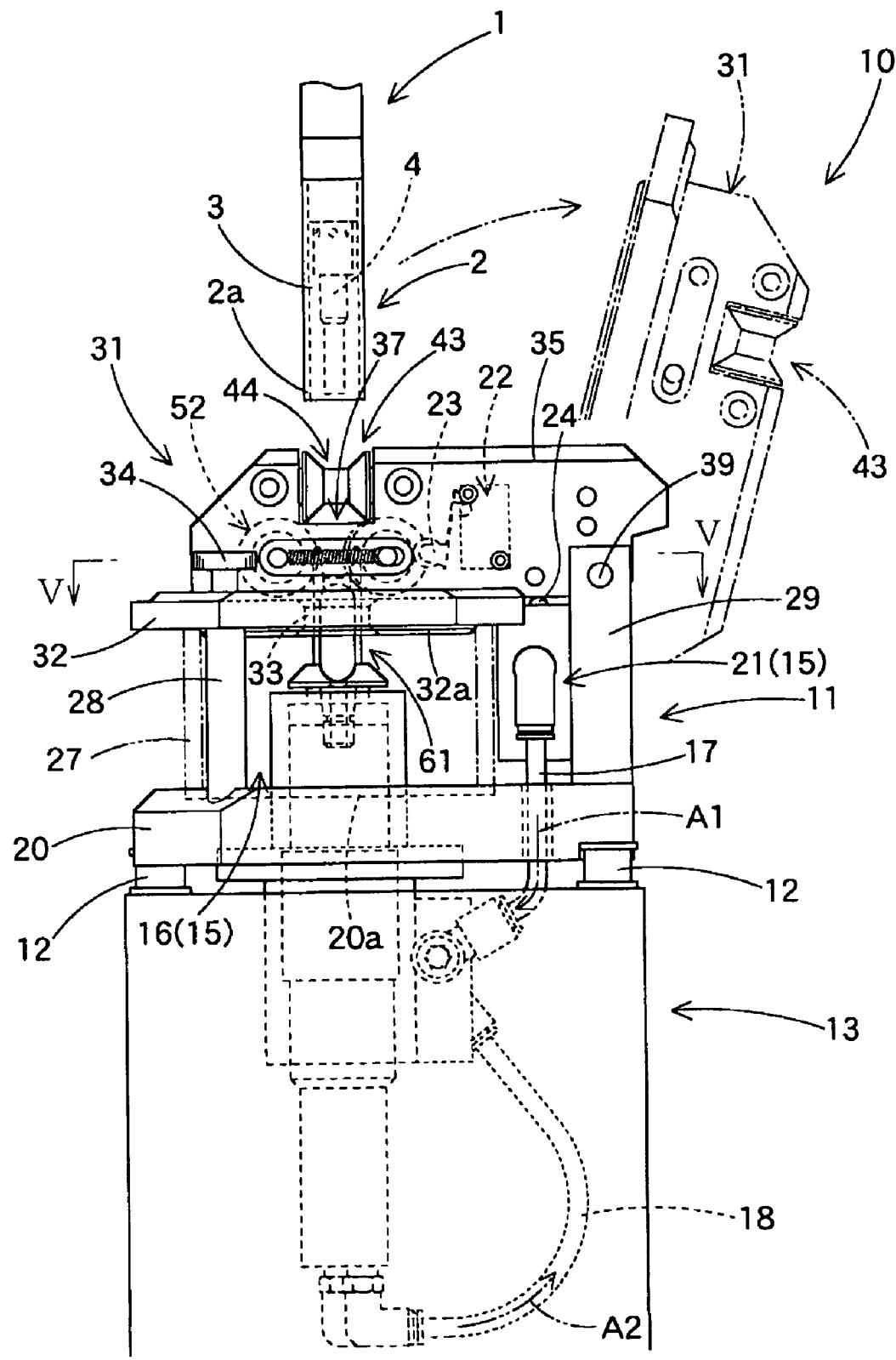
FIG. 1 is a side view of a nozzle cleaner according to an exemplary embodiment of the present invention.
Figure 2:
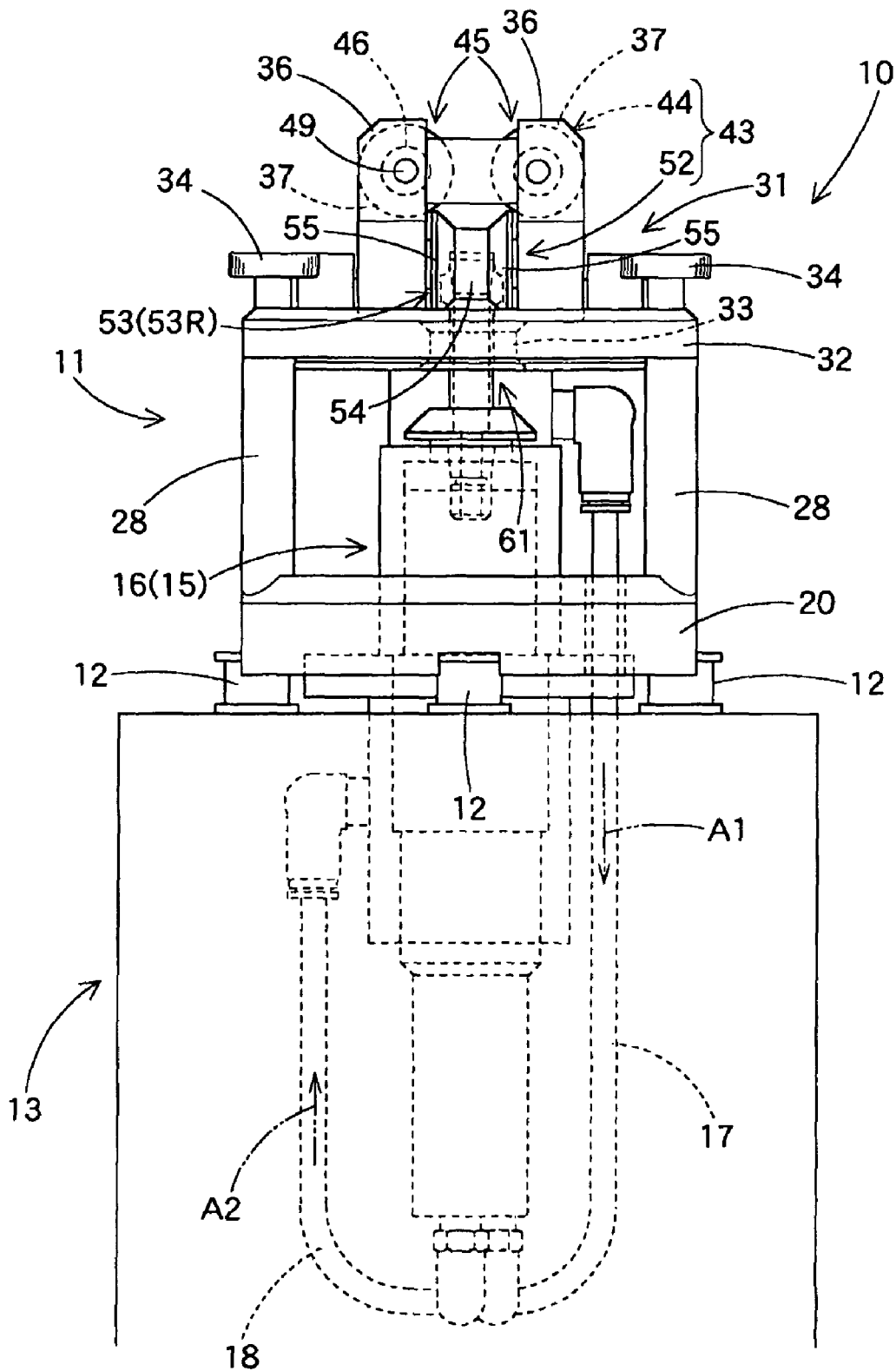
FIG. 2 is a front view of the nozzle cleaner according to the illustrated embodiment.
Figure 3:
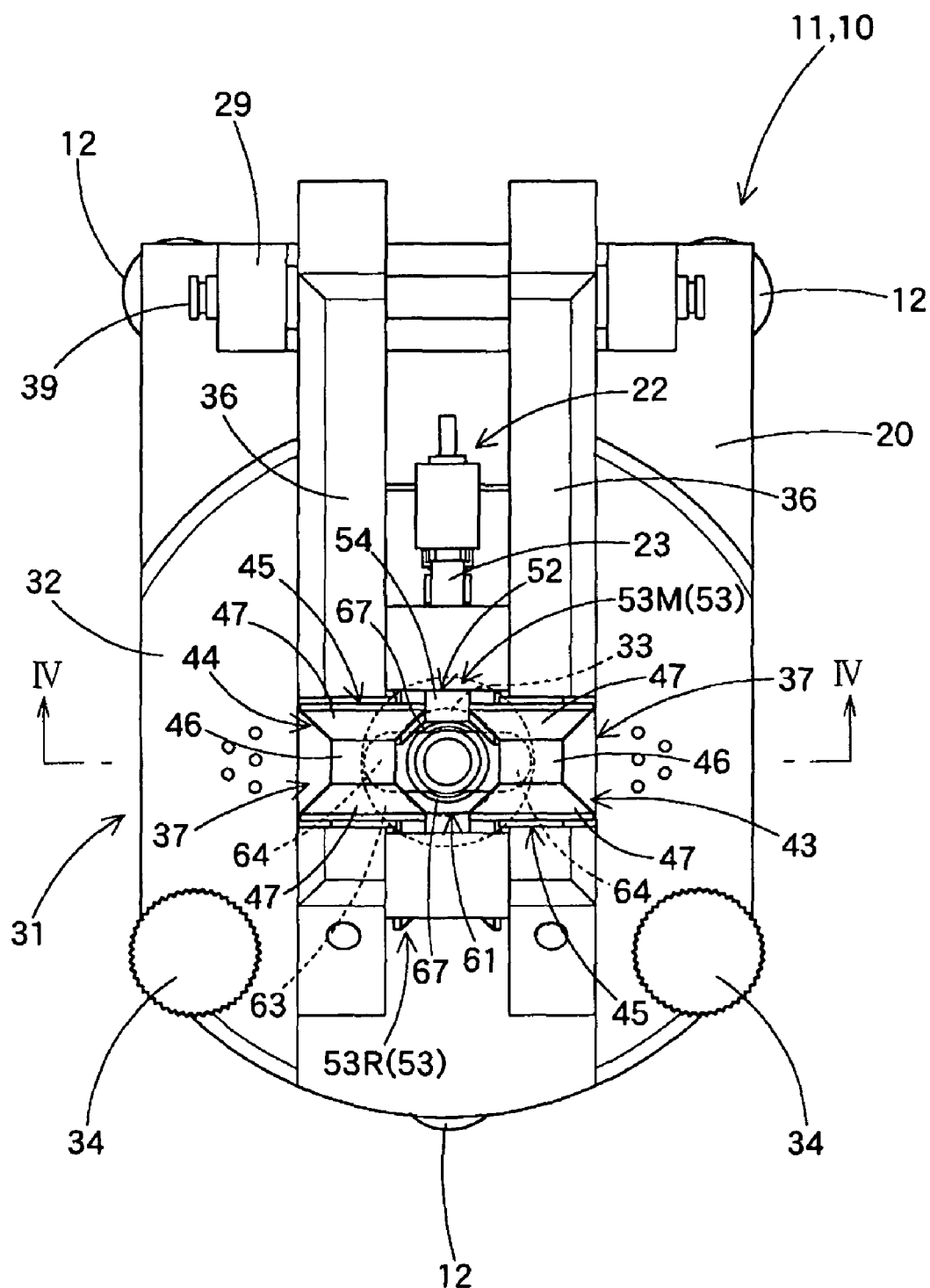
FIG. 3 is a plan view of the nozzle cleaner according to the illustrated embodiment.

Referring to FIGS. 1 to 3, a nozzle cleaner 10 according to an exemplary embodiment of the present invention is illustrated. The nozzle cleaner 10 includes a cleaner body 11, and a support frame 13 to support the cleaner body 11. The cleaner body 11 is connected to the support frame 13 via dampers 12 respectively arranged at several regions (for example, three regions) on an outer periphery of the cleaner body 11, in order to absorb a horizontal position deviation (in order to allow the cleaner body 11 to move horizontally) (FIGS. 1 and 2). In the illustrated embodiment, the support frame 13 is implemented by a motor housing. In this case, the support frame 13 covers a driving mechanism 15. Also, in the illustrated embodiment, the dampers 12 are interposed between the support frame 13 and an installation base 20 of the cleaner body 11. The installation base 20 will be described later.

As shown in FIGS. 1 to 5, the cleaner body 11 includes a cutter 61. The driving mechanism 15 is also included in the cleaner body 11, to rotate the cutter 61. The cleaner body 11 further includes a guide mechanism 43 to guide a welding nozzle 2 such that the welding nozzle 2 is centered with respect to the cutter 61. In the illustrated embodiment, the welding nozzle 2 is vertically movable. The following description associated with the illustrated embodiment will be given in conjunction with the case in which the direction of a tip of the welding nozzle 2 corresponds to a downward direction. In the following description associated with the illustrated embodiment, a forward or rearward direction, namely, a longitudinal direction, is also defined such that the start side of an opening direction of a support 31, which will be described later, corresponds to a rearward direction. The description will also be given in conjunction with the case in which the direction orthogonal to the opening direction of the support 31 corresponds to a lateral direction.

The welding nozzle 2 is mounted to a tip of a welding torch 1 retained by an arm of a welding robot. As shown in FIG. 1, the welding nozzle 2 has a double tube structure including an outer gas nozzle 3 and an inner wire nozzle 4.

Figure 4:
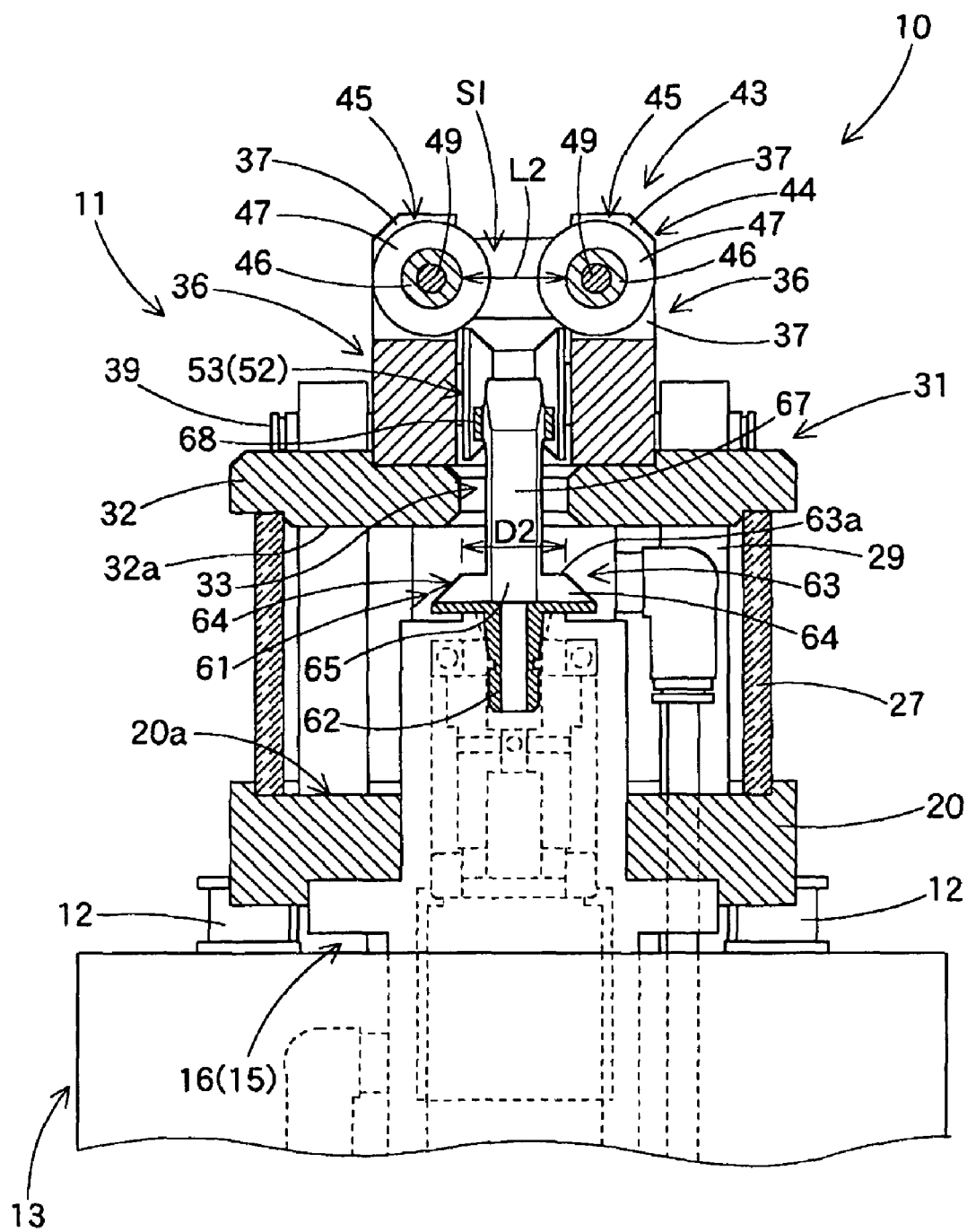
FIG. 4 is a cross-sectional view taken along a line IV-IV of FIG. 3, schematically illustrating the nozzle cleaner according to the illustrated embodiment.
Figure 6:
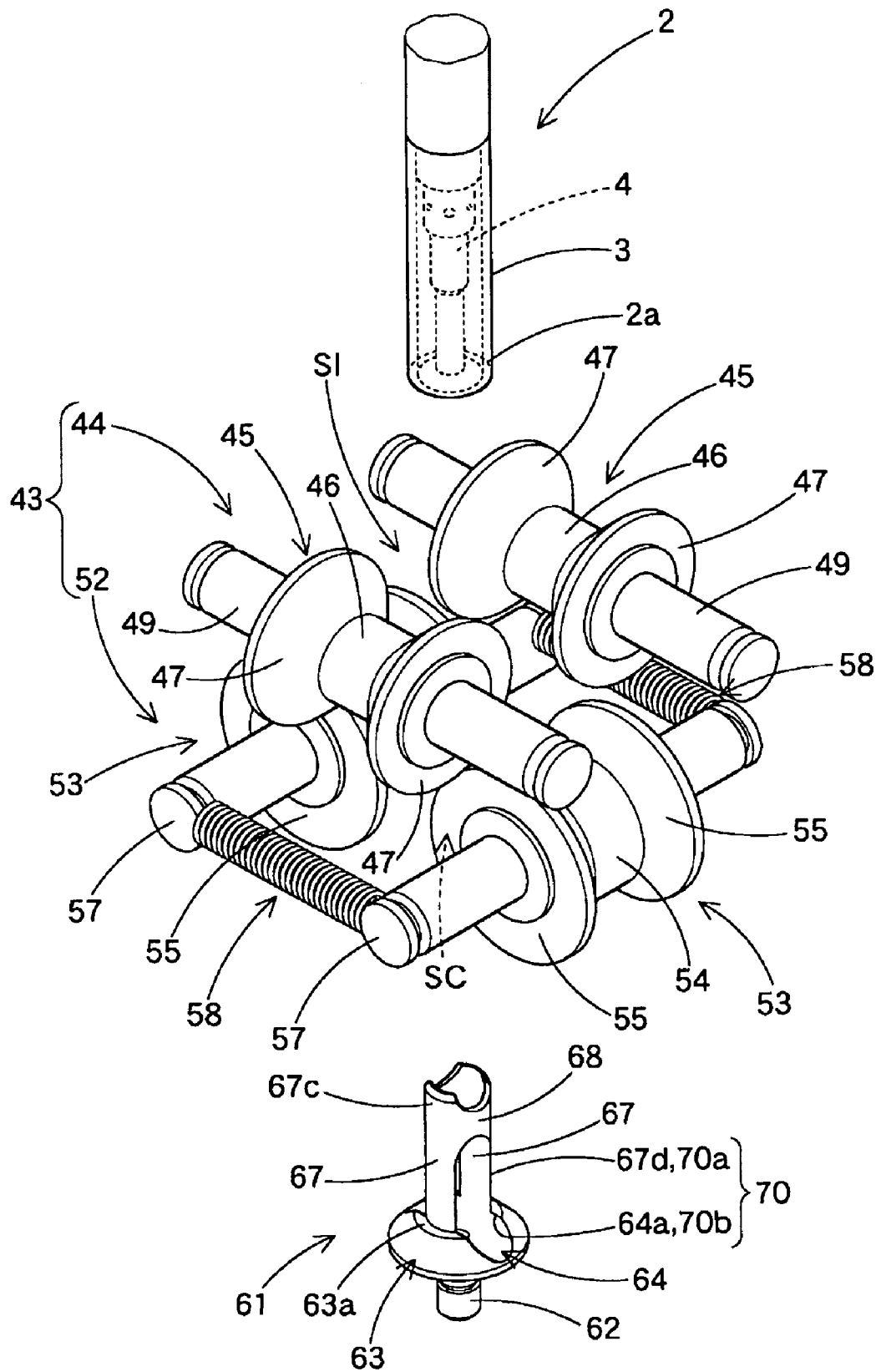
FIG. 6 is an exploded perspective view illustrating a guide mechanism and cutter included in the nozzle cleaner according to the illustrated embodiment, together with a welding nozzle.

As shown in FIGS. 4 and 6, the cutter 61 includes a connecting portion 62 provided at a lower end of the cutter 61. The connecting portion 62 has a substantially cylindrical shape, and is connected to a drive shaft of an air motor 16, which will be described later. The cutter 61 also includes an enlarged diameter portion 63 arranged at a start portion of the cutter 61 over the connecting portion 62 while having a substantially frustoconical shape, and two flat plate portions 67 arranged at an upper end of the cutter 61 such that the flat plate portions 67 extend upwardly from the enlarged diameter portion 63, while having a flat plate shape. In the illustrated embodiment, the cutter 61 is arranged such that a rotational central axis C1 thereof extends in a vertical direction. The flat plate portions 67 are formed at positions point-symmetrical about the rotational central axis C1, respectively. The flat plate portions 67 are configured such that outer peripheral surfaces thereof are opposite from each other while having a substantially semicircular shape, and inner surfaces thereof face each other while having a vertically planar shape. The flat plate portions 67 have an outer diameter D1 (FIG. 7) defined by the outer peripheral surfaces thereof such that the outer diameter D1 is substantially equal to an inner diameter d1 of the gas nozzle 3 (FIG. 12) while being less than an outer diameter D2 of an upper surface 63a of the enlarged diameter portion 63 (FIG. 4), in order to enable the flat plate portions 67 to be inserted into the gas nozzle 3, and then to peel off sputter S attached to an inner peripheral surface 3a of the gas nozzle 3 by inner-periphery-side cutting blades 70a which will be described later. The flat plate portions 67 are inclined at the outer peripheral surfaces thereof in the vicinity of upper ends 67c thereof such that they have a taper shape. Connection reinforcing portions 68 are provided in the vicinity of the upper ends 67c of the flat plate portions 67, to connect the flat plate portions 67, and thus to prevent the flat plate portions 67 from being deformed, for example, diverged from each other as they are spaced away from each other at the upper ends 67c thereof. In the illustrated embodiment, the connection reinforcing portions 68 have an arc shape such that outer peripheral surfaces thereof are continued from the outer peripheral surfaces of the flat plate portions 67.

Figure 12:
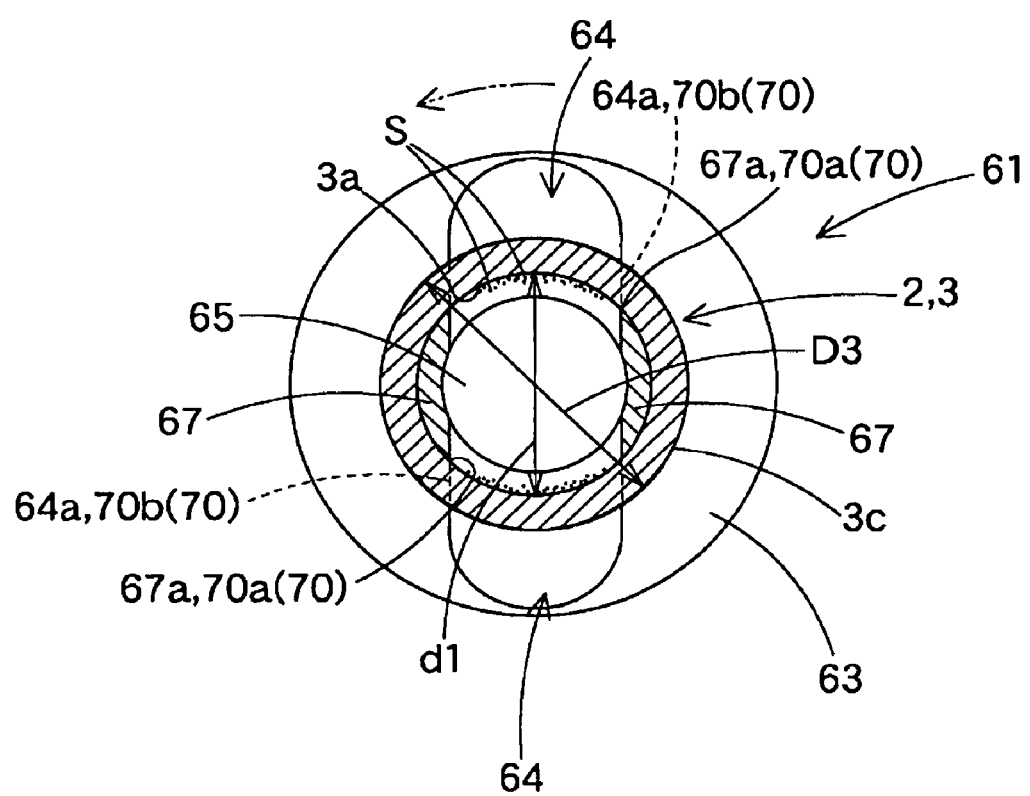
FIG. 12 is an enlarged cross-sectional view taken along a line XII-XII of FIG. 10C, illustrating a sputter removing operation in the nozzle cleaner according to the illustrated embodiment.
Figure 13:
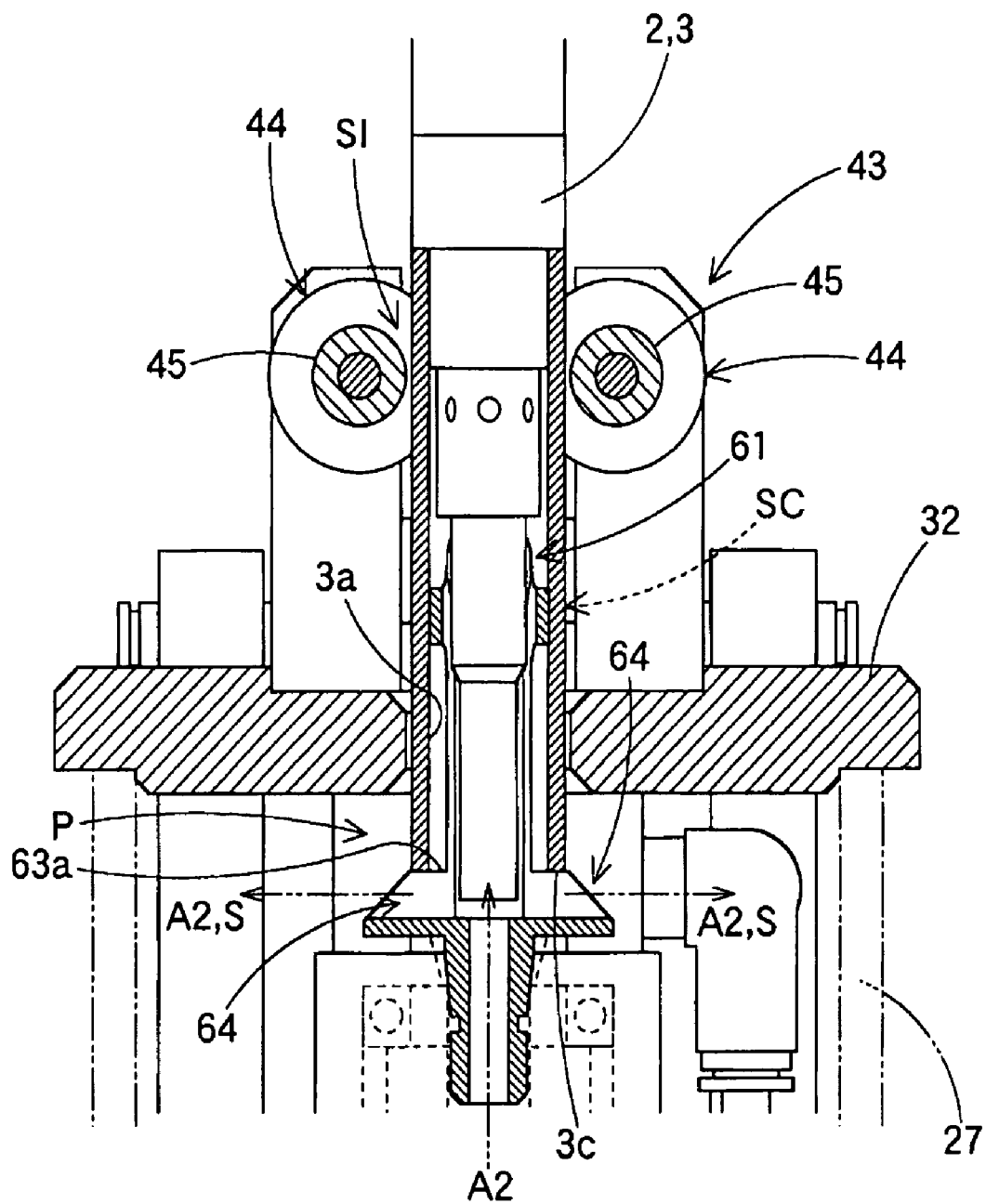
FIG. 13 is an enlarged partial longitudinal sectional view illustrating the sputter removing operation in the nozzle cleaner according to the illustrated embodiment.

The enlarged diameter portion 63 comes into contact with a tip surface 3b of the gas nozzle 3 when the gas nozzle 3 is inserted into a space defined between the flat plate portions 67 (FIG. 10). In the illustrated embodiment, the outer diameter D2 of the upper surface 63a is substantially equal to an outer diameter D3 of the gas nozzle 3 (FIG. 12). That is, when the tip surface 3b of the gas nozzle 3 comes into contact with the upper surface 63a of the enlarged diameter portion 63 in the illustrated embodiment, the welding nozzle 2 is positioned at a sputter removing position P (FIG. 9). Cut-out grooves 64 are provided at the enlarged diameter portion 63. The cut-out grooves 64 are formed by cutting out the enlarged diameter portion 63 at the upper surface of the enlarged diameter portion 63 such that the cut-out grooves 64 extend from respective inner surfaces of the flat plate portions 67 while having a substantially semicircular shape. The cut-out grooves 64 are formed to extend in a direction orthogonal to the rotational central axis C1 of the cutter 61. A through hole 65 is also formed in the enlarged diameter portion 63 such that the through hole 65 is connected to the connecting portion 62 (FIGS. 4 and 12). That is, in the illustrated embodiment, the cut-out grooves 64 connected to the through hole 65 defines an opening having a substantially semicircular cross-section under the condition in which the tip surface 3b of the gas nozzle 3 is in contact with the upper surface 63a of the enlarged diameter portion 63. The illustrated embodiment has a configuration in which air A2 used to drive the air motor 16 is forced to flow toward the cutter 61. As the cutter 61 rotates, the air A2 fills the gas nozzle 3 via the through hole 65. As a result, the sputter S removed from the inner peripheral surface 3a and tip surface 3b of the gas nozzle 3 is outwardly discharged through the cut-out grooves 64, together with the air A2 (FIG. 13).

In the illustrated embodiment, the cutter 61 includes blades 70 each provided at an end edge of each cut-off groove 64 and each flat plate portion 67. Each blade 70 includes an inner-periphery-side cutting blade 70a to remove sputter S attached to the inner peripheral surface 3a of the gas nozzle 3, and a start-portion-side cutting blade 70b to remove sputter S attached to the tip surface 3b of the gas nozzle 3. In the illustrated embodiment, the inner-periphery-side cutting blade 70a is provided by an edge 67d which is one of peripherally-arranged edges of each flat plate portion 67 arranged at the upper end of the cutter 61, namely, a leading one in a rotation direction from among edges of the cutter 61, while extending vertically below the connection reinforcing portions 68. The start-portion-side cutting blade 70b is provided by a leading one in a rotation direction from among end edges 64a of each cut-out groove 64 at the upper surface 63a of the enlarged diameter portion 63 arranged at the start portion of the cutter 61.

Figure 7:
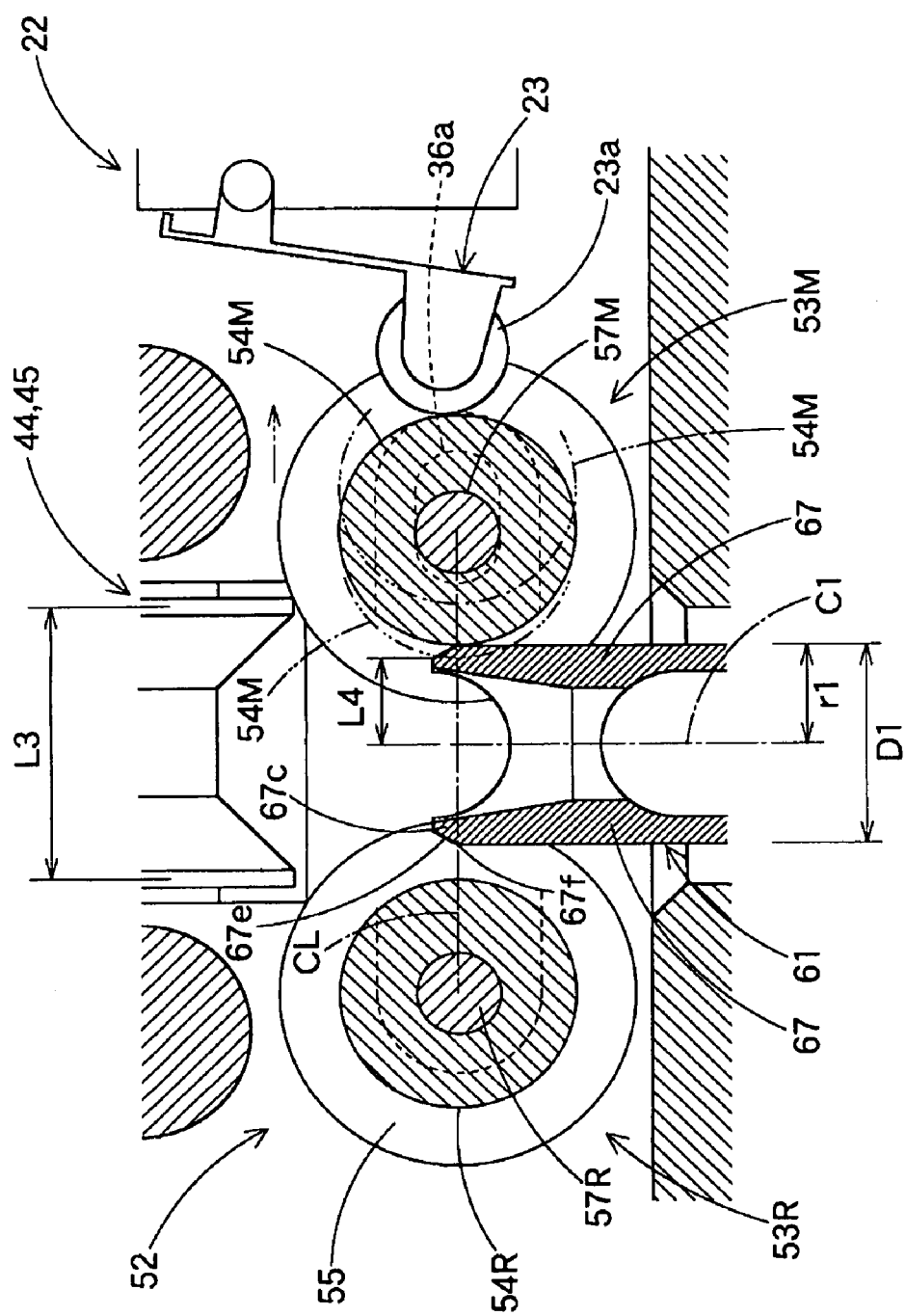
FIG. 7 is an enlarged sectional view illustrating a part of the nozzle cleaner according to the illustrated embodiment corresponding to a cutter-side roller unit.

In the nozzle cleaner 10 in the illustrated embodiment, the cutter 61 is arranged below a cutter-side space SC defined between smaller diameter portions 54 of guide rollers 53 constituting a cutter-side roller unit 52, in the vicinity of the cutter-side space SC. The guide rollers 53 will be described later. In detail, the cutter 61 is arranged such that the upper end of each blade 70 substantially aligns with a position where the smaller diameter portions 54 of the guide rollers 53 are approximate to each other. In more detail, in the illustrated embodiment, the cutter 61 is arranged such that a start portion 67f (lower end) of an outer-periphery-side inclined surface 67e of each flat plate portion 67 positioned in the vicinity of the upper end of the corresponding blade 70, namely, the upper end 67c of the flat plate portion 67, is positioned on a line CL connecting the centers of the smaller diameter portions 54 (FIG. 7).

As shown in FIGS. 1 and 2, the driving mechanism 15 includes, as a driving motor thereof, the air motor 16. The driving mechanism 15 also includes an operator valve 21 to control a driving operation of the air motor 16. In the illustrated embodiment, the air motor 16 is received, at a lower portion thereof, in the support frame 13 as a motor housing, and is mounted to the installation base 20 arranged over the support frame 13. The installation base 20 has a flat plate shape. The air motor 16 also includes a driving shaft (designated by no reference numeral) connected to the cutter 61, in order to rotate the cutter 61. In the vicinity of the air motor 16, an air passage not shown is formed to guide the air A2 guided through an air passage 18 to flow toward the cutter 61. The air passage 18 is provided in the support frame 13. An air passage 17 is also provided in the support frame 13. The air passages 17 and 18 extend into a lower portion of the air motor 16. The air passage 17 connects the air operator valve 21 and air motor 16, to guide air A1, which will be used to drive the air motor 16, toward the air motor 16. The air passage 18 extends from the air motor 16, to guide the air A2 used to drive the air motor 16 toward the cutter 61.

As shown in FIG. 1, the air operator valve 21 is arranged at the rear of the cutter 61 while being adjacent to a connecting wall 29 in front of the connecting wall 29. The connecting wall 29 will be described later. In detail, in the illustrated embodiment, the air operator valve 21 controls a driving operation of the air motor 16 in accordance with a triggering operation of a micromechanical valve 22. The micromechanical valve 22 constitutes a start switch for the air motor 16. The micromechanical valve 22 is arranged at the rear of a moving roller 53M included in the cutter-side roller unit 52 of the guide mechanism 43. The moving roller 53M will be described later. The micromechanical valve 22 includes an actuating member 23 arranged to be vertically inclined under the condition in which an upper end of the actuating member 23 is pivotally supported, such that a lower end of the actuating member 23 is directed to the moving roller 53M. The actuating member 23 is positioned within a movement range that the moving roller 53M moves to be spaced away from a fixed roller 53R. When the moving roller 53M moves rearwardly against coil springs 58 as an urging means, which will be described later, as the welding nozzle 2 is inserted, the micromechanical valve 22 comes into contact with the moving roller 53M, so that the micromechanical valve 22 is moved such that the lower end 23a is rearwardly directed. When the micromechanical valve 22 comes into contact with the moving roller 53M, it is switched on. The micromechanical valve 22 is connected with the air operator valve 21 via an air supply hose not shown. When the actuating member 23 of the micromechanical valve 22 is switched on, air is discharged into the air operator valve 21, thereby opening a valve member (not shown) of the air operator valve 21. In this case, accordingly, the air A1 is supplied to the air motor 16 via the air passage 17, thereby causing the air motor 16 to rotate the cutter 61.

In the vicinity of the air operator valve 21, as shown in FIGS. 1 and 2, a mechanical valve 24 is arranged. The mechanical valve 24 is upwardly protruded from an upper surface of the air operator valve 21 such that it comes into contact with a lower surface of one roller support plate 26 included in the support 31. The roller support plate 26 will be described later. As will be described later, the mechanical valve 24 operates to be closed when the contact thereof with the roller support plate 26 is released as the support 31 is upwardly rotated with respect to the connecting wall 29, together with the guide mechanism 43. When the mechanical valve 24 operates as described above, the supply of air to the air operator valve 21 is cut off, to prevent a malfunction of the air motor 16.

As shown in FIGS. 1 and 4, a cylindrical cover member 27 is mounted to an upper surface of the installation base 20, to cover a region surrounding the cutter 61. The cover member 27 is made of a transparent polycarbonate or acrylic resin, in order to enable the user to macroscopically identify the cutter 61. The cover member 27 functions to close a gap defined between the installation base 20 and a lid member 32 of the support 31 which will be described later. In the illustrated embodiment, a substantially-circular groove 20a is provided at the upper surface of the installation base 20. The groove 20a is formed by concaving an upper surface portion of the installation base 20 such that the concaved upper surface portion of the installation base 20 has a shape corresponding to an outer shape of the cover member 27. The cover member 27 is laid on the groove 20a.

As shown in FIGS. 1, 2, and 4, the support 31, which supports the guide mechanism 43, is installed over the installation base 20, using two support rods 28 installed at a front end of the support 31 in the vicinity of opposite lateral ends of the support 31, and the connecting wall 29 installed at a rear end of the support 31 while extending vertically. In the illustrated embodiment, the support 31 includes the lid member 32 which is horizontally arranged beneath the guide mechanism 43 while having a substantially circular plate shape. The support 31 also includes two roller support plates 36 upwardly protruded from an upper surface of the lid member 32 while being arranged to be laterally parallel to each other. The roller support plates 36 support guide rollers 45 and 53 constituting the guide mechanism 43, respectively. The guide rollers 45 and 53 will be described later. Each roller support plate 36 extends longitudinally such that a rear end thereof is rearwardly protruded beyond the lid member 32. In the illustrated embodiment, in the support 31, the lower surface of the lid member 32 is supported by upper ends of the support rods 28 in the vicinity of the front end of the lid member 32, and each roller support plate 36 is rotatably connected, at a rearward lower end portion thereof, to an upper end of the connecting wall 29, using a connecting shaft 39. The lid member 32 is connected to the support rods 28, using mounting screws 34. In the illustrated embodiment, when the connection of the lid member 32 with the support rods 28 is released by separation of the mounting screws 34, the support 31 can be rotated about the connecting shaft 38 with respect to the connecting wall 29, together with the guide mechanism 43, such that the front end of the support 31 is upwardly directed, so that the support 31 can be opened.

A substantially-circular protrusion 32a is formed at the lower surface of the lid member 32 such that it corresponds to the cover member 27. The protrusion 32a is slightly protruded toward a lower surface of the cover member 27 such that it is inserted into the interior of the cover member 27. Meanwhile, the groove 20a of the installation base 20 and the protrusion 32a of the lid member 32 are provided to prevent, as much as possible, formation of a gap between the lower end surface of the cover member 27 and the upper surface of the installation base 20 and between the upper end surface of the cover member 27 and the lower surface of the lid member 32. A through hole 33 is formed in the vicinity of a central portion of the lid member 32, to allow the cutter 61 to be inserted therethrough. The spacing between the roller support plates 36 is set to a distance allowing each guide roller 53 of the cutter-side roller unit 52 to be arranged between the roller support plates 36.

As shown in FIG. 6, the guide mechanism 43 includes an insertion-side roller unit 44 and a cutter-side roller unit 52 arranged adjacent to each other along the rotational central axis C1 (in the illustrated embodiment, a vertical direction). The insertion-side roller unit 44 is arranged in an insertion start region (in the illustrated embodiment, an upper region) where insertion of the welding nozzle 2 is carried out. The cutter-side roller unit 52 is arranged in a region where the cutter 61 is positioned, and the leading portion of the inserted welding nozzle 2 in an insertion direction of the welding nozzle 2 (in the illustrated embodiment, a lower portion) is positioned.

In the illustrated embodiment, the insertion-side roller unit 44 includes a pair of guide rollers 45 arranged to laterally face each other at opposite sides of the rotational central axis C1 of the cutter 61 such that the axial direction of each guide roller 45 is parallel with a longitudinal direction orthogonal to the rotational central axis C1 of the cutter 61, while being freely rotatable. In the illustrated embodiment, each guide roller 45 is arranged in a longitudinal direction within a receiving groove 37 formed by cutting out an upper end of a corresponding one of the roller support plates 36 in the form of a rectangular shape. Each guide roller 45 is also journalled on a support shaft 49 via a bush (not shown) so that it is freely rotatable. Each guide roller 45 has a substantially-hourglass-shaped structure including a substantially-cylindrical smaller diameter portion 46, and two enlarged diameter portions 47 arranged at opposite axial ends (opposite longitudinal ends) of the smaller diameter portion 46 while having a diameter increasing gradually from the smaller diameter portion 46. The welding nozzle 2 is inserted, from an upper side, into an insertion-side space SI defined between the smaller diameter portions 46 of the guide rollers 45. At this time, the guide rollers 45 guide the welding nozzle 2 toward the cutter 61. In detail, the guide rollers 45 are arranged such that they are point-symmetrical with respect to the rotational central axis C1 of the cutter 61, and a line connecting the axial centers of the smaller diameter portions 46 passes through the rotational central axis C1 of the cutter 61.

Figure 8:
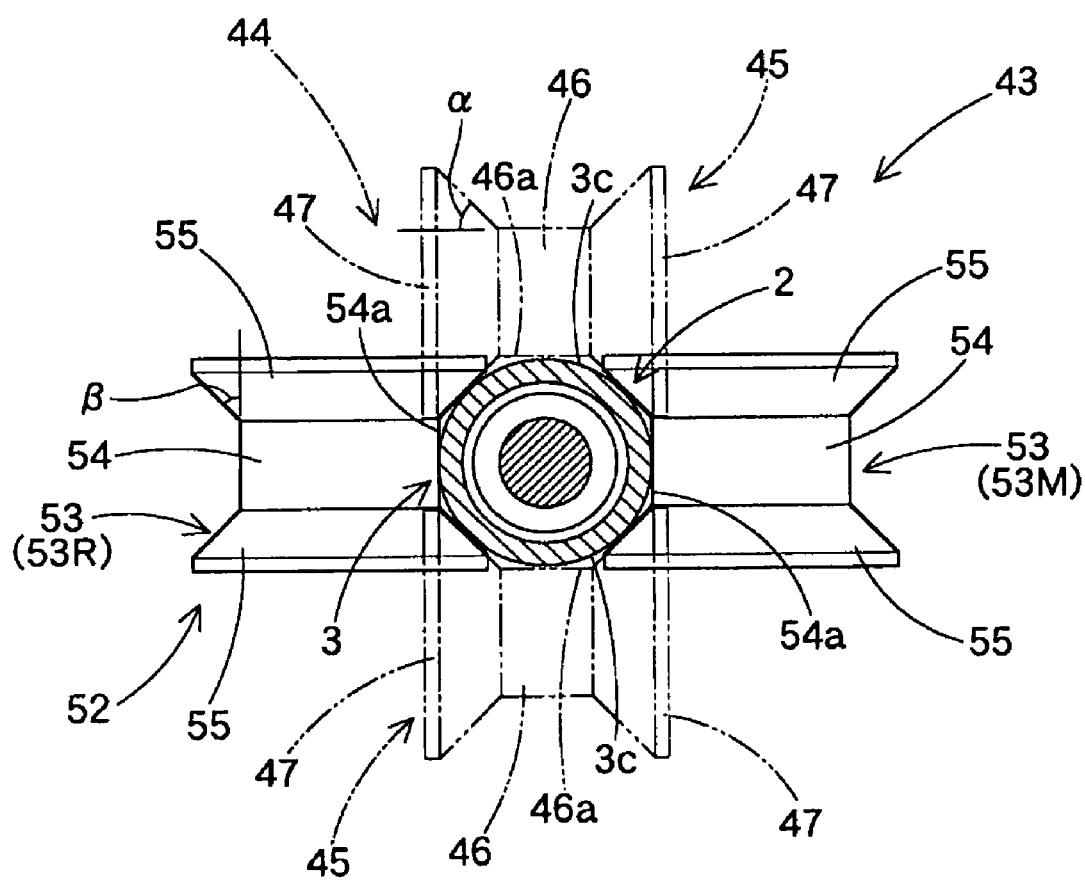
FIG. 8 is a schematic view illustrating arrangements of guide rollers constituting the guide mechanism in the nozzle cleaner according to the illustrated embodiment.
Figure 11A:
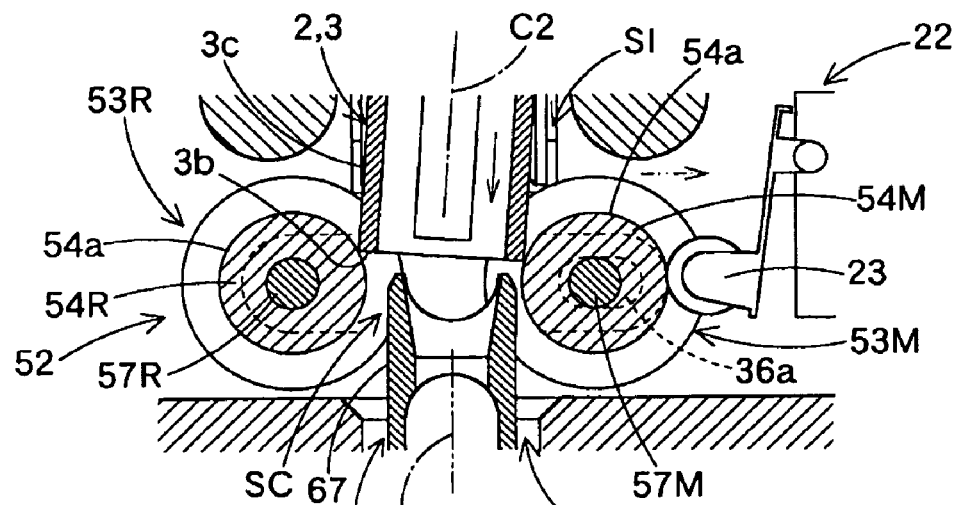
FIGS. 11A to 11C are enlarged partial longitudinal sectional views taken in a longitudinal direction, sequentially illustrating insertion of the welding nozzle into a space defined in a body of a cutter-side roller unit included in the guide mechanism in the nozzle cleaner according to the illustrated embodiment.
Figure 11B:
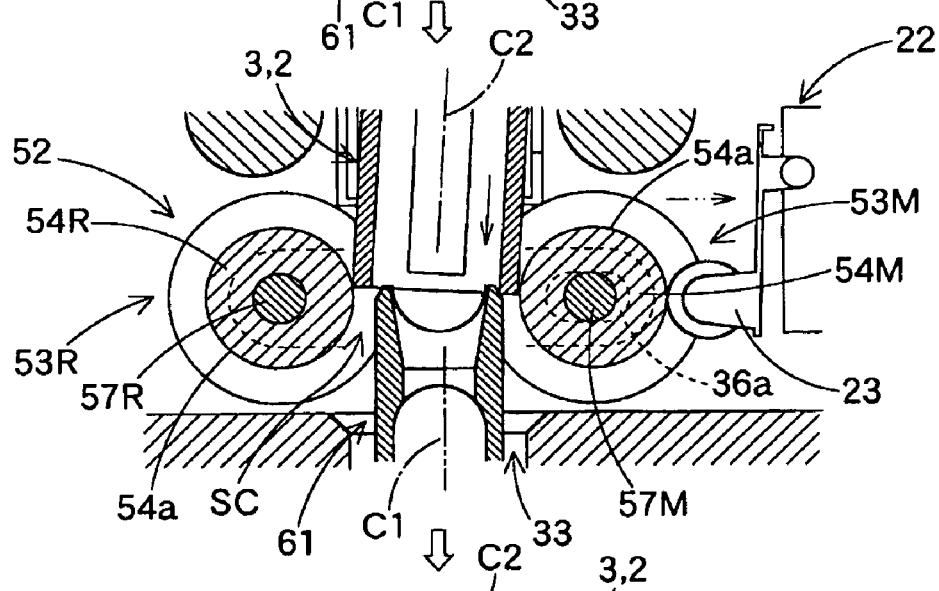
Figure 11C:
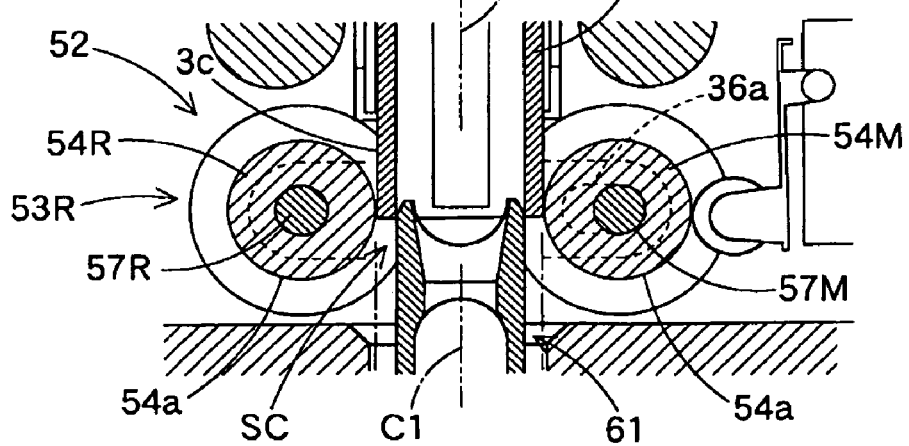

In the illustrated embodiment, the guide rollers 45 are arranged such that the opening width L2 of the insertion-side space SI between the smaller diameter portions 46 is substantially equal to the outer diameter D2 of the gas nozzle 3 included in the welding nozzle 2 (FIG. 4). In detail, the opening width L2 of the insertion-side space SI between the smaller diameter portions 46 of the guide rollers 45 is set to be slightly larger than the outer diameter D2 of the gas nozzle 3 (in the illustrated embodiment, by about 0.2 mm), in order to allow the welding nozzle 2 to be smoothly inserted into the insertion-side space SI. In the illustrated embodiment, each guide roller 45 is received in the corresponding receiving groove 37 such that the central axis thereof (the center of the corresponding support shaft 49) is inwardly shifted from the center of the corresponding roller support plate 36 in a thickness direction (FIG. 4). The enlarged diameter portion 47 of each guide roller 45 has a diameter gradually enlarged from the diameter of the corresponding smaller diameter portion 46, in order to guide the welding nozzle 2 to the vicinity of a central position on the smaller diameter portion 46 in an axial direction of the guide roller 45 (the vicinity of a central position in a longitudinal direction) when the welding nozzle 2 is inserted into the insertion-side space SI between the smaller diameter portions 46. In detail, in the illustrated embodiment, each enlarged diameter portion 47 has an inclination angle α of about 45° (FIG. 8) with respect to an axial direction, and the protrusion amount of the enlarged diameter portion 47 laterally protruded from the cross-section of the corresponding smaller diameter portion 46 when viewing in a direction of the rotational central axis C1 of the cutter 61 (vertical direction) is equal to about 1/3 of the opening width L2 of the insertion-side space SI between the smaller diameter portions 46, so that the enlarged diameter portion 47 substantially conforms to the outer peripheral surface 3c of the gas nozzle 3. In the illustrated embodiment, each enlarged diameter portion 47 is configured such that the outer end thereof is substantially aligned with an axial end of the smaller diameter portion 54 of the corresponding guide roller 53 included in the cutter-side roller unit 52 when viewing in a vertical direction (FIG. 8).

The cutter-side roller unit 52 includes a pair of guide rollers 53 arranged between the insertion-side roller unit 44 and the lid member 32 adjacent to the insertion-side roller unit 44 beneath the insertion-side roller unit 44. The guide rollers 53 are arranged to longitudinally face each other at opposite sides of the rotational central axis C1 of the cutter 61 such that the axial direction of each guide roller 53 is parallel with a lateral direction orthogonal to the rotational central axis C1 of the cutter 61, while being freely rotatable. Each guide roller 53 extends laterally such that it is suspended by the roller support plates 36. Each guide roller 53 is also journalled on a support shaft 57 via a bush (not shown) so that it is freely rotatable with respect to the roller support plates 36. That is, the cutter-side roller unit 52 and the insertion-side roller unit 44 are installed such that the arrangement direction of the facing guide rollers 53 and the arrangement direction of the facing guide rollers 45 are orthogonal to each other.

Similarly to each guide roller 45, each guide roller 53 constituting the cutter-side roller unit 52 has a substantially-hourglass-shaped structure including a cylindrical smaller diameter portion 54, and two enlarged diameter portions 55 arranged at opposite axial ends (opposite longitudinal ends) of the smaller diameter portion 54 while having a diameter increasing gradually from the smaller diameter portion 54. The welding nozzle 2 is inserted, from an upper side, into a cutter-side space SC defined between the smaller diameter portions 54 of the guide rollers 53. At this time, the guide rollers 53 guide the welding nozzle 2 toward the cutter 61. The guide rollers 54 are arranged such that a line connecting the axial centers of the smaller diameter portions 54 passes through the rotational central axis C1 of the cutter 61. In the illustrated embodiment, the smaller diameter portion 54 of each guide roller 53 constituting the cutter-side roller unit 52 has an outer diameter larger than the smaller diameter portion 46 of each guide roller 45 in the insertion-side roller unit 44. In the illustrated embodiment, as described above, the cutter 61 is arranged in the cutter-side space SC defined between the smaller diameter portions 54 of the guide rollers 53 constituting the cutter-side roller unit 52. The cutter 61 is arranged such that the tip end (upper end) of each blade 70 is positioned at a position where the smaller diameter portions 54 are most approximate to each other (FIG. 7).

Figure 5:
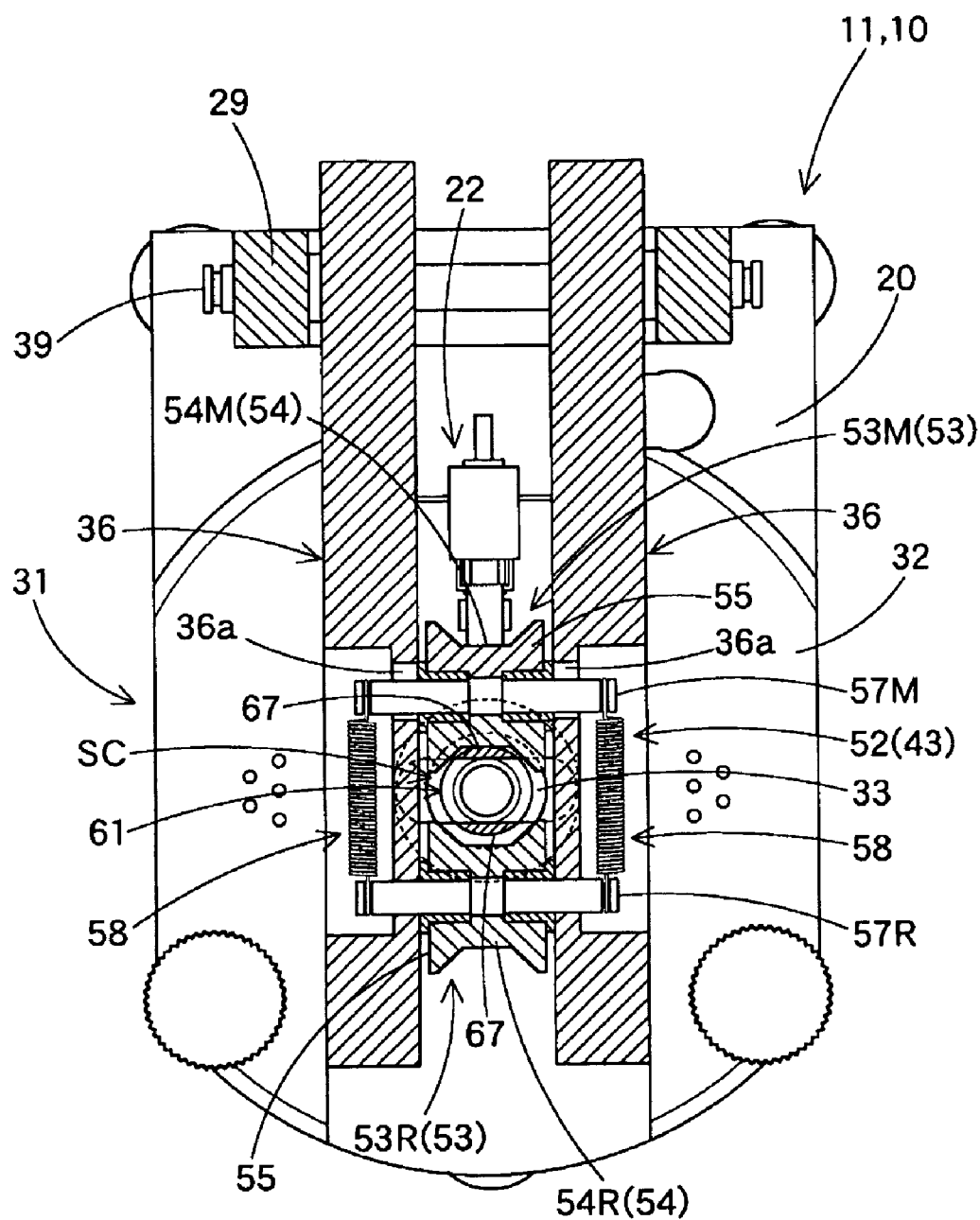
FIG. 5 is a cross-sectional view taken along a line V-V of FIG. 1, schematically illustrating the nozzle cleaner according to the illustrated embodiment.

In the cutter-side roller unit 52 in the illustrated embodiment, the guide roller 53 arranged at a front side is constituted by the fixed roller 53R, and the guide roller 53 arranged at a rear side is constituted by the moving roller 53M. The moving roller 53M is movable to be spaced away from the fixed roller 53R in a longitudinal direction orthogonal to the rotational central axis C1 of the cutter 61. The moving roller 53M is installed in a state of being always urged by an urging means to cause the outer peripheral surface 3c of the gas nozzle 3 to come into contact with the smaller diameter portion 54R of the fixed roller 53R when the welding nozzle 2 is inserted into the cutter-side space SC between the smaller diameter portions 54R and 54M. In detail, the support shaft 57M, on which the moving roller 53M is journalled, is inserted into an insertion hole 36a formed through each roller support plate 36 in the form of a longitudinally-elongated circular shape such that the support shaft 57M is longitudinally movable within the insertion hole 36a, as shown in FIGS. 5 and 7. Opposite ends of the support shafts 57M are connected with opposite ends of a support shaft 57R, on which the moving roller 53M is journalled, by coil springs 58 arranged in a longitudinal direction as the urging means, respectively (FIG. 5). In accordance with this connection, the moving roller 53M is arranged such that it is spaced away from the fixed roller 53R, and then returned toward the fixed roller 53R by the urging forces of the coil springs 58 (to be forwardly and rearwardly movable).

Meanwhile, in the illustrated embodiment, the spacing L4 between the rotational central axis C1 of the cutter 61 and the outer peripheral surface of the smaller diameter portion 54M of the moving roller 53M is set to be smaller than the radius r1 of the outer peripheral surfaces of the flat plate portions 67 in the cutter 61 under the condition in which the support shaft 57M, on which the moving roller 53M is journalled, is in contact with a front end surface of the insertion hole 36a (a surface arranged toward the fixed roller 53R) (FIG. 7). For this reason, in the illustrated embodiment, the support shaft 57M, on which the moving roller 53M is journalled, is positioned at a position substantially corresponding to a center of the insertion hole 36a in a longitudinal direction under the condition in which the cutter 61 is inserted into the cutter-side space SC between the smaller diameter portions 54R and 54M of the fixed roller 53R and moving roller 53M. Also, the smaller diameter portion 54M of the moving roller 53M is always in contact with the outer peripheral surface of the corresponding flat plate portion 67 in the cutter 61 by the urging forces of the coil springs 58. In the illustrated embodiment, the spacing between the rotational central axis C1 of the cutter 61 and the outer peripheral surface of the smaller diameter portion 54R of the fixed roller 53R is substantially equal to the radius r1 of the outer peripheral surfaces of the flat plate portions 67 in the cutter 61.

In the illustrated embodiment, the opening width L3 of the cutter-side space SC between the smaller diameter portions 54P and 54M of the fixed roller 53R and moving roller 53M (FIG. 7) is set to be slightly larger than the outer diameter D3 of the gas nozzle 3 in the welding nozzle 2 under the condition in which the moving roller 53M is spaced apart from the fixed roller 53R by a maximum distance, namely, the support shaft 57M, on which the moving roller 53M is journalled, is in contact with a rear end surface of the insertion hole 36a. In detail, the cutter-side space SC between the smaller diameter portions 54R and 54M of the fixed roller 53P and moving roller 53M is set to be substantially equal to the opening width L2 of the insertion-side space SI between the smaller diameter portions 46 of the insertion-side roller unit 44 while being slightly larger than the outer diameter D3 of the gas nozzle 3 (by about 0.2 mm in the illustrated embodiment) under the condition in which the support shaft 57M, on which the moving roller 53M is journalled, is in contact with the rear end surface of the insertion hole 36a.

Similarly to the insertion-side roller unit 44, in the cutter-side roller unit 52, the enlarged diameter portion 55 of each of the guide rollers 53 (the fixed roller 53R and moving roller 53M) has a diameter gradually enlarged from the diameter of the corresponding smaller diameter portion 54, in order to guide the welding nozzle 2 to the vicinity of a central position of the smaller diameter portion 54 in an axial direction of the guide roller 53 (the vicinity of a central position in a longitudinal direction) when the welding nozzle 2 is inserted into the cutter-side space SC between the smaller diameter portions 54. In detail, in the illustrated embodiment, similarly to the enlarged diameter portion 47 of each guide roller 45 in the insertion-side roller unit 44, each enlarged diameter portion 55 has an inclination angle β of about 45° (FIG. 8) with respect to an axial direction, and the protrusion amount of the enlarged diameter portion 55 longitudinally protruded from the cross-section of the corresponding smaller diameter portion 54 when viewing in a direction of the rotational central axis C1 of the cutter 61 (vertical direction) is equal to about ⅓ of the opening width L3 of the cutter-side space SC between the smaller diameter portions 54 spaced apart from each other in accordance with the insertion of the gas nozzle 3, so that the enlarged diameter portion 55 substantially conforms to the outer peripheral surface 3c of the gas nozzle 3. In the illustrated embodiment, each enlarged diameter portion 55 is configured such that the outer end thereof is positioned near an axial end of the smaller diameter portion 46 of the corresponding guide roller 45 included in the insertion-side roller unit 44 when viewing in a vertical direction.

That is, in the guide mechanism 43 in the illustrated embodiment, the enlarged diameter portions 47 and 55 of the guide rollers 45 and 53 in the insertion-side roller unit 44 and cutter-side roller unit 52 overlap with each other when viewing in a direction parallel to the rotational central axis C1 of the cutter 61, namely, a vertical direction (FIG. 8). For this reason, in the guide mechanism 43 in the illustrated embodiment, the welding nozzle 2 (gas nozzle 3) inserted into the cutter-side space SC between the smaller diameter portions 54 of the guide rollers 53 in the cutter-side roller unit 52 is surrounded, throughout the overall peripheral region thereof, by inner peripheral surfaces substantially forming an octagonal shape, namely, the inner peripheral surfaces of the smaller diameter portions 46 and 54 and enlarged diameter portions 47 and 55 of the guide rollers 45 and 53 in the insertion-side roller unit 44 and cutter-side roller unit 52, when viewing in a direction parallel to the rotational central axis C1 of the cutter 61.

Upon operating the nozzle cleaner 10 in the illustrated embodiment, after performing a gas arc welding process for a predetermined time, the welding robot aligns the axial direction of the welding nozzle 2 mounted to the tip of the welding torch 1 with the vertical direction, positions the welding nozzle 2 over the guide mechanism 43, and then lowers the welding nozzle 2 to a sputter removing position P. When the welding nozzle 2 is positioned at the sputter removing position P as it is downwardly moved while being guided by the guide mechanism 43 in a state of being centered with respect to the cutter 61, the cutter 61 is rotated to remove sputter S attached to the inner peripheral surface 3a and tip surface 3b of the gas nozzle 3. The removed sputter S is discharged from the cut-out grooves 64 provided at the cutter 61 into a space surrounded by the installation base 20, cover member 27, and lid member 32 arranged around the cutter 61, together with air A2 (FIG. 13).

Upon operating the nozzle cleaner 10 in the illustrated embodiment, a leading end 2a of the welding nozzle 2 is first inserted into the insertion-side space SI between the smaller diameter portions 46 of the guide rollers 45 in the insertion-side roller unit 44, and then moved in a direction corresponding to the nozzle leading end (a downward direction in the illustrated embodiment) along an axial direction of the welding nozzle 2. At this time, the welding nozzle 2 is guided by the guide rollers 45 and 53 of the insertion-side roller unit 44 and cutter-side roller unit 52 such that it is moved to the sputter removing position P in a state of being centered with respect to the cutter 61. In this state, the blades 70 of the cutter 61 are inserted toward the inner peripheral surface 3a of the welding nozzle 2 (gas nozzle 3). In detail, in the nozzle cleaner 10 in the illustrated embodiment, each guide roller 45 constituting the insertion-side roller unit 44 and each guide roller 53 constituting the cutter-side roller unit 52 include respective smaller diameter portions 46 and 54 having a cylindrical shape, and respective pairs of enlarged diameter portions 47 and 55 extending from axial opposite ends of the corresponding smaller diameter portions 46 and 54 while having a diameter increasing gradually from the corresponding smaller diameter portions 46 and 54. Also, the space between the smaller diameter portions 46 (insertion-side space SI) and the space between the smaller diameter portions 54 (cutter-side space SC) are set to be substantially equal to the outer diameter D3 of the welding nozzle 2 (gas nozzle 3).

Accordingly, when the welding nozzle 2 is moved to be inserted into the insertion-side space SI between the smaller diameter portions 46 of the guide rollers 45 in the insertion-side roller unit 44, the insertion direction of the welding nozzle 2 is regulated by the outer peripheral surface 46a of each smaller diameter portion 46 in a lateral direction crossing (orthogonal to) the axial direction of the corresponding guide roller 45, and the welding nozzle 2 is guided, in a longitudinal direction corresponding to the axial direction of the guide roller 45, to the vicinity of a central position on the smaller diameter portion 46 in a longitudinal direction corresponding to the axial direction of the smaller diameter portion 46 by the enlarged diameter portions 47, even though the welding nozzle 2 may be inserted such that the center (axial center) C2 is inclined with respect to the rotational central axis C1 of the cutter 61, as shown in FIGS. 9A and 10A. Thus, in the insertion-side space SI, the welding nozzle 2 is arranged such that the center (axial center) C2 is aligned with the rotational central axis C1 of the cutter 61.

Thereafter, the welding nozzle 2 is moved to be inserted into the cutter-side space SC between the smaller diameter portions 54 of the guide rollers 53 in the cutter-side roller unit 52. At this time, the insertion direction of the welding nozzle 2 is regulated by the outer peripheral surface 54a of each smaller diameter portion 54 in a longitudinal direction crossing (orthogonal to) the axial direction of the corresponding guide roller 53, and the welding nozzle 2 is guided, in a lateral direction corresponding to the axial direction of the guide roller 53, to the vicinity of a central position on the smaller diameter portion 54 in a lateral direction corresponding to the axial direction of the smaller diameter portion 54 by the enlarged diameter portions 55, even though the welding nozzle 2 is inserted such that the center (axial center) C2 is inclined with respect to the rotational central axis C1 of the cutter 61, as shown in FIGS. 9B and 10B. Thus, even in the cutter-side space SC, the welding nozzle 2 is arranged such that the center (axial center) C2 is aligned with the rotational central axis C1 of the cutter 61. When the leading end 3a of the welding nozzle 2 is inserted into the cutter-side space SC between the smaller diameter portions 54 of the guide rollers 53 in the cutter-side roller unit 52, the welding nozzle 2 passes through the insertion-side space SI and cutter-side space SC formed in two regions spaced apart from each other in a direction along the rotational central axis C1 of the cutter 61 (vertical direction) under the condition in which the center (axial center) C2 of the welding nozzle 2 is aligned with the rotational central axis C1 of the cutter 61. As a result, the center (axial center) C2 of the welding nozzle 2 is arranged to be co-axial and parallel with the rotational central axis C1 of the cutter 61. Thus, the center (axial center) C2 of the welding nozzle 2 is centered with the rotational central axis C1 of the cutter 61.

In other words, in the nozzle cleaner 10 in the illustrated embodiment, the welding nozzle 2 is inserted into insertion holes (the space between the smaller diameter portions 46 including the space between the enlarged diameter portions 47 and the space between the smaller diameter portions 54 including the space between the enlarged diameter portions 55) formed at two regions spaced apart from each other in a direction along the rotational central axis C1 of the cutter 61 (vertical direction). Accordingly, the welding nozzle 2 is centered with the axial axes of the two insertion holes, and thus with the rotational central axis C1 of the cutter 61. Of course, in the illustrated embodiment, the resistance applied to the welding nozzle 2 when the welding nozzle 2 is guided by the insertion holes is small because the guide rollers 45 and 53 constituting the insertion-side roller unit 44 and cutter-side roller unit 52 while forming the edges of the insertion holes are arranged to be freely rotatable. Also, the deformation of the welding nozzle 2 by the guide rollers 45 and 53 is also inhibited. Thus, it is possible to smoothly guide the welding nozzle 2 toward the cutter 61.

In particular, in the nozzle cleaner 10 in the illustrated embodiment, shaking of the center (axial center) C2 of the welding nozzle 2 with respect to the rotational central axis C1 of the cutter 61 during the insertion of the welding nozzle 2 is prevented as the welding nozzle 2 passes through the space between the smaller diameter portions 46 in a pair of guide rollers 45 arranged to face each other and the space between the smaller diameter portions 54 in a pair of guide rollers 53 arranged to face each other. In the illustrated embodiment, as shown in FIG. 8, the insertion-side roller unit 44 and cutter-side roller unit 52, in which the arrangement direction of the facing guide rollers 45 and the arrangement direction of the facing guide rollers 53 are orthogonal to each other, are arranged adjacent to each other along the rotational central axis C1 of the cutter 61. Accordingly, it is possible to securely prevent the shaking of the center (axial center) C2 of the welding nozzle 2 by a simple configuration including only two stages, namely, the insertion-side roller unit 44 and cutter-side roller unit 52. When the welding nozzle 2 is moved to the sputter removing position P while maintaining the centering of the center (axial center) C2 of the welding nozzle 2 with the rotational central axis C1 of the cutter 61, the blades 70 can be inserted into the welding nozzle 2. In particular, in the nozzle cleaner 10 in the illustrated embodiment, the welding nozzle 2 (gas nozzle 3) is surrounded, throughout the overall peripheral region thereof, by inner peripheral surfaces substantially forming an octagonal shape, namely, the inner peripheral surfaces of the smaller diameter portions 46 and 54 and enlarged diameter portions 47 and 55 of the guide rollers 45 and 53 in the insertion-side roller unit 44 and cutter-side roller unit 52, when viewing in a direction parallel to the rotational central axis C1 of the cutter 61. Accordingly, it is possible to more securely avoid shaking of the center (axial center) C2 of the welding nozzle 2 after the centering.

As a result, it is possible to position the welding nozzle 2 at the sputter removing position P while inserting the blades 70 of the cutter 61 toward the inner peripheral surface 3a under the condition in which the center (axial center) C2 of the welding nozzle 2 is highly accurately centered with respect to the rotational central axis C1 of the cutter 61, only by inserting the welding nozzle 2 into the insertion-side space SI between the smaller diameter portions 46 of the guide rollers 45 in the insertion-side roller unit 44, and then downwardly moving the welding nozzle 2 such that the welding nozzle 2 is more deeply inserted (FIGS. 9C and 10C). It is then possible to peel off sputter S from the inner peripheral surface 3a of the welding nozzle 2 by rotating the cutter 61 (FIGS. 12 and 13).

Thus, the nozzle cleaner 10 in the illustrated embodiment can be simply configured, and the centering of the welding nozzle 2 with the cutter 61 can also be easily achieved.

Meanwhile, in the nozzle cleaner 10 in the illustrated embodiment, even when the welding robot downwardly moves the welding nozzle in a state, in which the welding robot has been horizontally moved within a range that the welding nozzle 2 can be inserted into the insertion-side space SI, in order to insert the welding nozzle 2 into the guide mechanism 43, such a horizontal position deviation may be absorbed by the dampers 12 arranged between the cleaner body 11 and the support frame 13. Accordingly, it is possible to effectively remove sputter S attached to the welding nozzle 2.

Also, in the nozzle cleaner 10 in the illustrated embodiment, one guide roller 53 of the cutter-side roller unit 52 is constituted by the moving roller 53M, whereas the other guide roller 53 of the cutter-side roller unit 52 is constituted by the fixed roller 53R. The moving roller 53M is movable to be spaced away from the fixed roller 53R in a longitudinal direction orthogonal to the rotational central axis C1 of the cutter 61. The moving roller 53M is installed in a state of being always urged by the coil springs 58 as the urging means to cause the outer peripheral surface 3c of the welding nozzle 2 (gas nozzle 3) to come into contact with the smaller diameter portion 54R of the fixed roller 53R when the welding nozzle 2 is inserted into the cutter-side space SC between the smaller diameter portions 54. Accordingly, although the movement direction of the welding nozzle 2 may be slightly misaligned from the rotational central axis C1 of the cutter 61 when the leading end 2a of the welding nozzle 2 is inserted into the cutter-side space SC between the smaller diameter portions 54 of the guide rollers 53 in the cutter-side roller unit 52, the moving roller 53M first moves rearwardly to be spaced away from the fixed roller 53R, and then urges the welding nozzle 2 toward the fixed roller 53R to bring the outer peripheral surface 3c into contact with the outer peripheral surface 54a of the smaller diameter portion 54R of the fixed roller 53R. Thus, the accuracy of the centering of the welding nozzle 2 with respect to the cutter 61 on the basis of the fixed roller 53R can be further improved.

Of course, if such a condition is not taken into consideration, both guide rollers constituting the cutter-side roller unit may be constituted by fixed rollers. Although the moving roller is provided only in the cutter-side roller in the illustrated embodiment, one of the guide rollers constituting the insertion-side roller unit may also be constituted by the moving roller.

Also, in the nozzle cleaner 10 in the illustrated embodiment, the air motor 16 as the driving mechanism to rotate the cutter 61 includes the micromechanical valve 22 as the start switch to start the rotation of the cutter 61. The micromechanical valve 22 is arranged at the rear of the moving roller 53M. The actuating member 23, which operates to switch on the micromechanical valve 22, is positioned within a movement range that the moving roller 53M moves to be spaced away from the fixed roller 53R. When the moving roller 53M is spaced away from the fixed roller 53R against the coil springs 58 as the welding nozzle 2 is inserted into the cutter-side space SC between the smaller diameter portions 54R and 54M of the cutter-side roller unit 52, the actuating member 23 is pressed by the moving roller 53M, thereby switching on the micromechanical valve 22. That is, in the nozzle cleaner 10 in the illustrated embodiment, the actuating member 23 switches on the micromechanical valve 22 when it comes into contact with the moving roller 53M, thereby starting the rotation of the cutter 61. Accordingly, the switch can operate conveniently and accurately without being influenced by the removed sputter, while maintaining high durability, as compared to the case in which a non-contact type switch is used.

Of course, if such a condition is not taken into consideration, the start switch for the driving mechanism may be configured such that it is not linked to the movement of the moving roller. In this case, a non-contact type switch may be used. The start switch is not limited to the micromechanical valve. For the start switch, a typical limit switch may be used.

Also, in the nozzle cleaner 10 in the illustrated embodiment, the cutter 61 is arranged between the smaller diameter portions 54 of the cutter-side roller unit 52 such that the tip end (upper end) of each blade 70 is positioned at a position where the smaller diameter portions 54 of the guide rollers 53 in the cutter-side roller unit 52 are most approximate to each other. Accordingly, once the centering of the center (axial center) C2 of the welding nozzle 2 with respect to the rotational central axis C1 of the cutter 61 is completed, it is possible to immediately insert the blades 70 of the cutter 61 toward the inner peripheral surface 3a of the welding nozzle 2 (gas nozzle 3). Thus, the movement distance of the welding nozzle 2 can be set to a short distance. It is also possible to compactly arrange the cutter-side roller unit 52 and cutter 61 (to compact the space associated with the rotational central axis C1 of the cutter 61). If such conditions are not taken into consideration, it is unnecessary to install the cutter in the space defined in a body of the cutter-side roller unit. In this case, the cutter may be installed at a position spaced apart from the cutter-side roller unit (in a region beneath the cutter-side roller unit in an arrangement as in the illustrated embodiment).

Also, in the nozzle cleaner 10 in the illustrated embodiment, each blade 70 of the cutter 61 includes the inner-periphery-side cutting blade 70a to remove sputter S attached to the inner peripheral surface 3a of the welding nozzle 2 (gas nozzle 3), and the start-portion-side cutting blade 70b to remove sputter S attached to the tip surface 3b of the welding nozzle 2 (gas nozzle 3). The start-portion-side cutting blade 70b is arranged to come into contact with the tip surface 3b of the gas nozzle 3 at a position where the blade 70 has been completely inserted into the welding nozzle 2. That is, in the nozzle cleaner 10 in the illustrated embodiment, the start-portion-side cutting blade 70b of each blade 70 in the cutter 61 can prevent an excessive movement of the welding nozzle 2 in an insertion direction because the start-portion-side cutting blade 70b functions a stopper to regulate a movement of the welding nozzle 2 in the insertion direction. Accordingly, it is possible to accurately position the welding nozzle 2 at the sputter removing position P. In the nozzle cleaner 10 in the illustrated embodiment, it is possible not only to remove sputter attached to the inner peripheral surface 3a of the gas nozzle 3 by the inner-periphery-side cutting blade 70a, but also to remove sputter attached to the tip surface 3b of the gas nozzle 3 by the start-portion-side cutting blade 70b. Of course, if such conditions are not taken into consideration, a configuration including no start-portion-side blade may be used for the cutter. Meanwhile, although the cutter 61 has a double blade structure including two flat plate portions 67 in the illustrated embodiment, the structure of the cutter 61 is not limited thereto. A cutter having a single blade structure having one flat plate portion may also be used.

Meanwhile, in the nozzle cleaner 10 in the illustrated embodiment, the structure used for each of the guide rollers 45 and 53 includes one smaller diameter portion 46 or 54 having a cylindrical shape with a constant outer diameter, and two enlarged diameter portions 47 or 55 respectively enlarged in diameter from opposite ends of the smaller diameter portion 46 or 54. Of course, other structures may be used. For example, in the structure for each guide roller, the smaller diameter portion may have a diameter minimized at the center thereof in an axial direction while being gently reduced as the smaller diameter portion extends from each enlarged diameter portion to the center of the smaller diameter portion such that the outline on the cross-section of the smaller diameter portion taken in a direction orthogonal to the axis of the smaller diameter portion has a semi-arc shape. However, the guide roller, which has the above-described structure including one smaller diameter portion having a cylindrical shape with a constant outer diameter, and two enlarged diameter portions respectively enlarged in diameter from the opposite ends of the smaller diameter portion, is preferable in that it can be easily manufactured. Also, in the nozzle cleaner 10 in the illustrated embodiment, the guide mechanism 43 is configured to include roller units of two stages, namely, the insertion-side roller unit 44 and cutter-side roller unit 52. However, the guide mechanism may be configured to include roller units having an increased number of stages, for example, three stages.

Also, the nozzle cleaner 10 in the illustrated embodiment is configured to outwardly discharge the sputter S removed by the cutter 61, from the cut-out grooves 64 provided at the cutter 61, together with the air A2. In this case, it is possible to prevent the sputter S to be severely scattered, because the cutter 61 is covered by the transparent cover member 27. In the nozzle cleaner 10 in the illustrated embodiment, the support 31 can be opened together with the guide mechanism 43. In this connection, the air operator valve 21, which operates the air motor 16, is provided with the mechanical valve 24 to close the air operator valve 21 when the support 31 is opened. Accordingly, even when the moving roller 53M moves in an opened state of the support 31, thereby pressing the actuating member 23 of the micromechanical valve 22, the actuating member 23 is not switched on. In this case, accordingly, the air A1 is not supplied to the air motor 16. Thus, it is possible to prevent malfunction of the air motor 16.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A nozzle cleaner for removing sputter attached to at least an inner peripheral surface of a cylindrical welding nozzle for gas arc welding, comprising:
    a cutter including a blade provided at a leading end of the cutter, the blade being inserted toward the inner peripheral surface of the welding nozzle as the welding nozzle moves to a sputter removing position in a direction corresponding to a tip of the welding nozzle along an axial direction of the welding nozzle, and then peeling off the sputter attached to the inner peripheral surface of the welding nozzle as the cutter rotates;
    a driving mechanism to rotate the cutter; and
    a guide mechanism to center the welding nozzle with respect to a rotational central axis of the cutter when the welding nozzle moves to the sputter removing position, to enable the blade of the cutter to be inserted toward the inner peripheral surface of the welding nozzle;
    wherein the guide mechanism comprises an insertion-side roller unit and a cutter-side roller unit arranged adjacent to each other along the rotational central axis of the cutter; the insertion-side roller unit is positioned in a region where the welding nozzle is inserted; and the cutter-side roller unit is positioned in a region where the cutter is arranged, and a leading portion of the inserted welding nozzle is positioned.

2. The nozzle cleaner according to claim 1, wherein the blade comprises:
    an inner-periphery-side cutting blade formed to extend in an axial direction of the rotational central axis of the cutter, the inner-periphery-side cutting blade being inserted toward the inner-peripheral surface of the welding nozzle, to remove sputter attached to the inner peripheral surface of the welding nozzle; and
    a start-portion-side cutting blade formed at a start portion of the cutter, the start-portion-side cutting blade coming into contact with a tip end surface of the welding nozzle at an insertion completion position where the inner-periphery-side cutting blade is in a state of being completely inserted into the welding nozzle, to remove sputter attached to the tip end surface of the welding nozzle.

3. The nozzle cleaner according to claim 1, wherein each of the insertion-side roller unit and the cutter-side roller unit comprises a pair of guide rollers arranged to face each other at opposite sides of the rotational central axis of the cutter such that an axial direction of each guide roller is orthogonal to the rotational central axis of the cutter, while being freely rotatable.

4. The nozzle cleaner according to claim 3, wherein:
    each of the guide rollers has a substantially-hourglass-shaped structure including a substantially-cylindrical smaller diameter portion, and two enlarged diameter portions arranged at opposite axial ends of the smaller diameter portion while having a diameter increasing gradually from the smaller diameter portion;
    the facing guide rollers in each of the insertion-side roller unit and the cutter-side roller unit are arranged such that a space defined between the smaller diameter portions of the guide rollers is substantially equal to an outer diameter of the welding nozzle; and
    the enlarged diameter portions are enlarged in diameter from the corresponding smaller diameter portion such that, when the welding nozzle is inserted into the space between the smaller diameter portions, the enlarged diameter portions guide the welding nozzle to a vicinity of a central position on the corresponding smaller diameter portion in an axial direction of the corresponding guide roller.

5. The nozzle cleaner according to claim 4, wherein the cutter is arranged such that a tip end of the blade is substantially positioned at a position where the smaller diameter portions of the guide rollers in the cutter-side roller unit are most approximate to each other.

6. The nozzle cleaner according to claim 4, wherein the cutter is arranged such that a tip end of the blade is substantially positioned at a position where the smaller diameter portions of the guide rollers in the cutter-side roller unit are most approximate to each other.

7. The nozzle cleaner according to claim 4, wherein the blade comprises:
    an inner-periphery-side cutting blade formed to extend in an axial direction of the rotational central axis of the cutter, the inner-periphery-side cutting blade being inserted toward the inner-peripheral surface of the welding nozzle, to remove sputter attached to the inner peripheral surface of the welding nozzle; and
    a start-portion-side cutting blade formed at a start portion of the cutter, the start-portion-side cutting blade coming into contact with a tip end surface of the welding nozzle at an insertion completion position where the inner-periphery-side cutting blade is in a state of being completely inserted into the welding nozzle, to remove sputter attached to the tip end surface of the welding nozzle.

8. The nozzle cleaner according to claim 3, wherein the facing guide rollers of the cutter-side roller unit and the facing guide rollers of the insertion-side roller unit are arranged in arrangement directions orthogonal to each other, respectively.

9. The nozzle cleaner according to claim 3, wherein:

one roller of the cutter-side roller unit comprises a moving roller, and the other roller of the cutter-side roller unit comprises a fixed roller; and the moving roller is installed to be movable to be spaced away from the fixed roller in a longitudinal direction orthogonal to the rotational central axis of the cutter, in a state of being always urged by an urging unit to cause an outer peripheral surface of the welding nozzle to come into contact with a smaller diameter portion of the fixed roller.

10. The nozzle cleaner according to claim 9, further comprising:

a driving mechanism to rotate the cutter, the driving mechanism including a start switch to start a rotation of the cutter.

11. The nozzle cleaner according to claim 10, wherein the start switch includes an actuating member arranged within a movement range that the moving roller moves to be spaced away from the fixed roller, such that the actuating member is pressed by the moving roller when the moving roller is spaced away from the fixed roller against the urging unit as the welding nozzle is inserted into the space between the smaller diameter portions of the cutter-side roller unit, thereby switching on the start switch.

* * * * *